US009851532B2

(12) United States Patent
Chen et al.

(10) Patent No.: US 9,851,532 B2
(45) Date of Patent: Dec. 26, 2017

(54) MOBILE DEVICE AND OPTICAL IMAGING LENS THEREOF

(71) Applicant: GeniuS Electronic Optical Co., Ltd., Taichung (TW)

(72) Inventors: Shih-Han Chen, Taichung (TW); Yan Bin Chen, Xiamen (CN); Baina Chen, Xiamen (CN)

(73) Assignee: GeniuS Electronic Optical (Xiamen) Co., Ltd, Xiamen (CN)

( * ) Notice: Subject to any disclaimer, the term of this patent is extended or adjusted under 35 U.S.C. 154(b) by 75 days.

(21) Appl. No.: 14/605,648

(22) Filed: Jan. 26, 2015

(65) Prior Publication Data

US 2016/0119510 A1   Apr. 28, 2016

(30) Foreign Application Priority Data

Oct. 23, 2014   (CN) .......................... 2014 1 0571552

(51) Int. Cl.
| | |
|---|---|
| G02B 13/18 | (2006.01) |
| G02B 13/00 | (2006.01) |
| G02B 7/02 | (2006.01) |
| G02B 9/62 | (2006.01) |

(52) U.S. Cl.
CPC ......... G02B 13/0045 (2013.01); G02B 7/021 (2013.01); G02B 9/62 (2013.01)

(58) Field of Classification Search
CPC . G02B 9/00; G02B 9/62; G02B 13/00; G02B 13/001; G02B 13/0015; G02B 13/002; G02B 13/0045; G02B 13/008; G02B 13/14
See application file for complete search history.

(56) References Cited

U.S. PATENT DOCUMENTS

| | | | |
|---|---|---|---|
| 7,663,814 B2 | 2/2010 | Kitahara | |
| 8,040,618 B2 | 10/2011 | Kitahara | |
| 8,385,006 B2 * | 2/2013 | Tsai ...................... | G02B 13/18 |
| | | | 359/708 |
| 2012/0069140 A1 | 3/2012 | Tsai et al. | |
| 2012/0194726 A1 | 8/2012 | Huang et al. | |
| 2012/0262806 A1 | 10/2012 | Huang | |
| 2013/0003193 A1 | 1/2013 | Huang | |
| 2013/0033762 A1 | 2/2013 | Tsai et al. | |
| 2013/0070346 A1 | 3/2013 | Hsu et al. | |
| 2013/0235473 A1 | 9/2013 | Chen et al. | |
| 2013/0314804 A1 | 11/2013 | Kubota et al. | |

(Continued)

FOREIGN PATENT DOCUMENTS

| | | |
|---|---|---|
| TW | 201239447 | 10/2012 |
| TW | 201348789 | 12/2013 |
| TW | 201439584 | 10/2014 |

OTHER PUBLICATIONS

Official Action from Taiwanese Patent Application No. 103138783 dated Feb. 22, 2016.

*Primary Examiner* — Thong Nguyen

(74) *Attorney, Agent, or Firm* — Baker & McKenzie LLP

(57) ABSTRACT

The present invention provides a mobile device and an optical imaging lens thereof. The optical imaging lens comprises six lens elements positioned in an order from an object side to an image side. Through controlling the convex or concave shape of the surfaces of the lens elements, the optical imaging lens shows better optical characteristics and the total length of the optical imaging lens is shortened.

19 Claims, 37 Drawing Sheets

(56) References Cited

U.S. PATENT DOCUMENTS

| | | | |
|---|---|---|---|
| 2013/0335833 A1 | 12/2013 | Liao et al. | |
| 2014/0009844 A1* | 1/2014 | Tsai | G02B 9/62 |
| | | | 359/713 |
| 2014/0049843 A1 | 2/2014 | Kubota et al. | |
| 2014/0063616 A1 | 3/2014 | Okano et al. | |
| 2014/0078603 A1* | 3/2014 | You | G02B 13/0045 |
| | | | 359/738 |
| 2014/0153117 A1 | 6/2014 | Hagiwara | |
| 2015/0241659 A1* | 8/2015 | Huang | G02B 13/0045 |
| | | | 348/360 |
| 2015/0319389 A1* | 11/2015 | Huang | H04N 5/374 |
| | | | 348/311 |
| 2016/0004042 A1* | 1/2016 | Kubota | G02B 9/62 |
| | | | 359/713 |

* cited by examiner

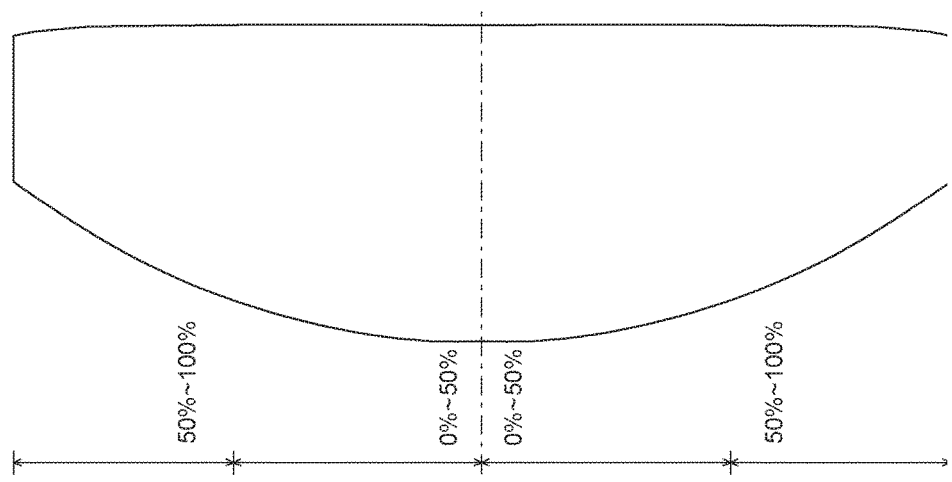
FIG. 4
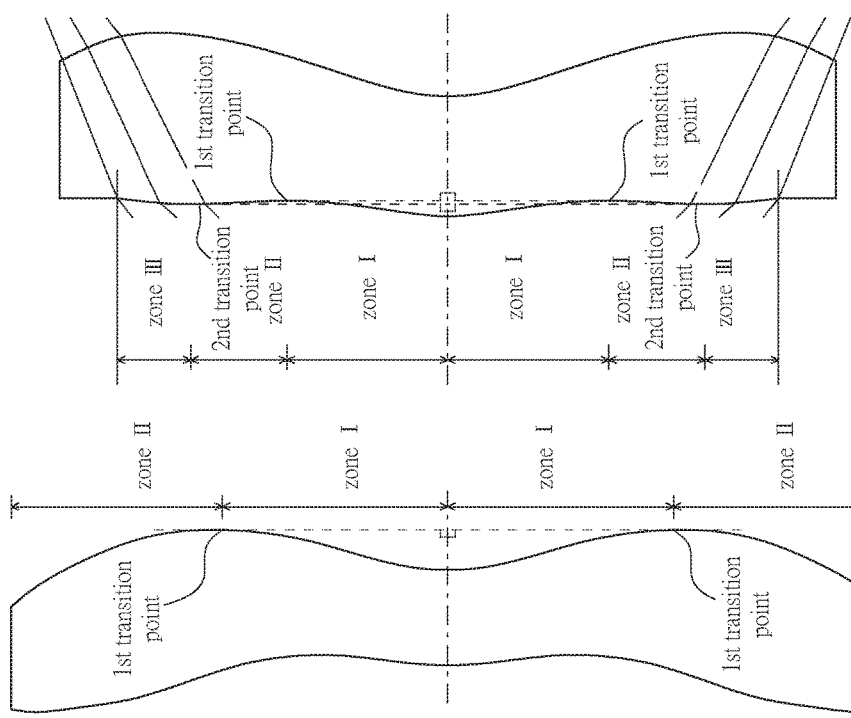
FIG. 3
FIG. 5

| f(Focal length)= 3.219mm, HFOV(Half angular field of view)= 35.274deg., Fno= 2.110, Image height=2.3mm, System length=4.761mm ||||||||
|---|---|---|---|---|---|---|---|
| Surface # | | Radius | Thickness | Refractive index | Abbe number | Focal length | Material |
| - | Object | ∞ | 400.0000 | | | | |
| 111 | 1st lens element | 1.8423 | 0.3651 | 1.535 | 55.712 | 7.920 | plastic |
| 112 | | 3.0260 | 0.1196 | | | | |
| 100 | Aperture stop | 0.0000 | -0.0428 | | | | |
| 121 | 2nd lens element | 4.2944 | 0.7478 | 1.535 | 55.712 | 3.548 | plastic |
| 122 | | -3.2139 | 0.2858 | | | | |
| 131 | 3rd lens element | -1.4878 | 0.4611 | 1.643 | 22.437 | -3.357 | plastic |
| 132 | | -5.2822 | 0.1304 | | | | |
| 141 | 4th lens element | -2.9380 | 0.4837 | 1.535 | 55.712 | 2.520 | plastic |
| 142 | | -0.9795 | 0.0599 | | | | |
| 151 | 5th lens element | 4.6853 | 0.3623 | 1.535 | 55.712 | -5.269 | plastic |
| 152 | | 1.7161 | 0.2000 | | | | |
| 161 | 6th lens element | 1.4360 | 0.4367 | 1.531 | 55.744 | -14.732 | plastic |
| 162 | | 1.0856 | 0.4000 | | | | |
| 171 | IR cut filter | ∞ | 0.2100 | 1.517 | 64.167 | | glass |
| 172 | | ∞ | 0.5406 | | | | |
| 180 | Image plane | ∞ | | | | | |

FIG. 8

| Aspherical parameters | | | | | | |
|---|---|---|---|---|---|---|
| Surface # | 111 | 112 | 121 | 122 | 131 | 132 |
| K | -1.6169E+00 | -9.4810E+00 | -5.2086E+01 | 7.6921E+00 | 8.8251E-01 | 2.0387E+01 |
| $a_4$ | 1.5258E-02 | 4.9372E-02 | 6.8421E-02 | -1.1463E-01 | -2.8128E-01 | -1.6289E-01 |
| $a_6$ | 2.7020E-02 | 6.1384E-02 | -3.4875E-02 | -5.7257E-02 | 1.5746E-01 | 2.9527E-02 |
| $a_8$ | -1.1381E-01 | -3.6720E-01 | -9.8976E-03 | 1.3334E-01 | 2.1606E-01 | 7.6031E-02 |
| $a_{10}$ | 1.5555E-01 | 1.0123E+00 | 2.8275E-02 | -1.8404E-01 | -2.7149E-01 | -1.1706E-02 |
| $a_{12}$ | -1.4181E-01 | -1.2992E+00 | -2.3172E-01 | 3.3353E-02 | 1.1081E-01 | -1.7318E-02 |
| $a_{14}$ | -1.3527E-03 | 3.6989E-01 | 5.4914E-01 | 6.0236E-02 | 2.7378E-02 | -2.5325E-03 |
| $a_{16}$ | 3.8530E-02 | 3.2827E-01 | -5.7012E-01 | -6.3582E-02 | -8.1017E-02 | 7.6135E-03 |
| Surface # | 141 | 142 | 151 | 152 | 161 | 162 |
| K | 5.4905E+00 | -1.0073E+00 | 5.6868E+00 | -7.5382E+00 | -3.9385E+00 | -3.6171E+00 |
| $a_4$ | -1.8030E-02 | 1.2130E-01 | -3.0589E-02 | -5.1749E-02 | -1.4108E-01 | -1.0019E-01 |
| $a_6$ | -1.0580E-01 | -1.0337E-01 | -1.2899E-02 | 1.7399E-02 | 1.8964E-02 | 2.5092E-02 |
| $a_8$ | 3.3556E-02 | 1.2738E-02 | 5.8460E-03 | -4.0608E-03 | 1.9250E-03 | -3.5414E-03 |
| $a_{10}$ | 1.2483E-03 | 5.6606E-03 | 3.1659E-04 | -3.9564E-05 | 2.4735E-04 | -1.4843E-04 |
| $a_{12}$ | 1.5486E-02 | 2.8481E-03 | -1.4805E-03 | -1.1541E-04 | -1.3127E-04 | 6.9106E-05 |
| $a_{14}$ | 1.0320E-02 | 3.1189E-03 | -9.0722E-05 | 1.6613E-05 | -7.4597E-05 | 1.2012E-05 |
| $a_{16}$ | 4.4842E-03 | 2.2131E-03 | 8.9118E-05 | 0.0000E+00 | 1.8546E-05 | -2.3368E-06 |

FIG. 9

| f(Focal length)= 3.645mm, HFOV(Half angular field of view)= 32.550deg., Fno= 2.065, Image height=2.3mm, System length=4.869mm ||||||||
|---|---|---|---|---|---|---|---|
| Surface # | | Radius | Thickness | Refractive index | Abbe number | Focal length | Material |
| - | Object | ∞ | 400.0000 | | | | |
| 211 | 1st lens element | 1.5415 | 0.7278 | 1.535 | 55.712 | 8.848 | plastic |
| 212 | | 1.9057 | 0.2266 | | | | |
| 200 | Aperture stop | 0.0000 | -0.0072 | | | | |
| 221 | 2nd lens element | 6.0672 | 0.5475 | 1.535 | 55.712 | 3.561 | plastic |
| 222 | | -2.7030 | 0.3705 | | | | |
| 231 | 3rd lens element | -1.4863 | 0.2399 | 1.643 | 22.437 | -3.258 | plastic |
| 232 | | -5.3420 | 0.1383 | | | | |
| 241 | 4th lens element | -2.9177 | 0.3646 | 1.535 | 55.712 | 2.617 | plastic |
| 242 | | -0.9896 | 0.0600 | | | | |
| 251 | 5th lens element | 4.8427 | 0.2899 | 1.535 | 55.712 | -5.660 | plastic |
| 252 | | 1.8279 | 0.3346 | | | | |
| 261 | 6th lens element | 1.9536 | 0.4650 | 1.531 | 55.744 | -22.612 | plastic |
| 262 | | 1.5420 | 0.4000 | | | | |
| 271 | IR cut filter | ∞ | 0.2100 | 1.517 | 64.167 | | glass |
| 272 | | ∞ | 0.5012 | | | | |
| 280 | Image plane | ∞ | | | | | |

FIG. 12

| Aspherical parameters | | | | | | |
|---|---|---|---|---|---|---|
| Surface # | 211 | 212 | 221 | 222 | 231 | 232 |
| K | -7.0510E-01 | -2.1343E+00 | -1.3721E+02 | 6.5859E+00 | 6.8853E-01 | 2.0221E+01 |
| $a_4$ | 4.0270E-02 | 7.6547E-02 | 3.5536E-02 | -6.7200E-02 | -2.6476E-01 | -1.8335E-01 |
| $a_6$ | 6.7839E-03 | 9.9743E-02 | -5.1165E-02 | -3.8385E-02 | 2.5106E-01 | 1.1764E-02 |
| $a_8$ | -9.7219E-02 | -3.2703E-01 | -3.2690E-04 | 1.4315E-01 | 2.0528E-01 | 8.3351E-02 |
| $a_{10}$ | 1.8239E-01 | 1.0562E+00 | 3.9319E-02 | -1.8339E-01 | -3.3114E-01 | -1.2922E-02 |
| $a_{12}$ | -1.1758E-01 | -1.2743E+00 | -2.5637E-01 | 2.2298E-02 | 8.0568E-02 | -2.2355E-02 |
| $a_{14}$ | 6.9741E-03 | 2.9785E-01 | 4.4205E-01 | 4.5333E-02 | 5.8503E-02 | -6.5473E-03 |
| $a_{16}$ | 6.3606E-03 | -4.6590E-02 | -7.9476E-01 | -6.4246E-02 | 1.6599E-03 | 5.8820E-03 |
| Surface # | 241 | 242 | 251 | 252 | 261 | 262 |
| K | 5.5272E+00 | -9.6836E-01 | 7.8833E+00 | -8.6438E+00 | -2.6932E+00 | -3.0161E+00 |
| $a_4$ | -5.2656E-02 | 1.1560E-01 | -2.5990E-02 | -5.9689E-02 | -1.1801E-01 | -1.0236E-01 |
| $a_6$ | -1.1888E-01 | -1.0187E-01 | -1.2088E-02 | 1.9050E-02 | 1.9899E-02 | 2.8228E-02 |
| $a_8$ | 1.8880E-02 | 1.8503E-02 | 4.3461E-03 | -3.8123E-03 | 1.7461E-03 | -3.1922E-03 |
| $a_{10}$ | -3.2159E-03 | 8.1934E-03 | -2.4116E-04 | -9.2038E-05 | 2.0872E-04 | -1.8838E-04 |
| $a_{12}$ | 1.8112E-02 | 3.4017E-03 | -1.5968E-03 | -1.5888E-04 | -1.4001E-04 | 5.2363E-05 |
| $a_{14}$ | 1.5165E-02 | 3.5960E-03 | -7.8552E-05 | -2.3907E-06 | -7.8302E-05 | 9.7434E-06 |
| $a_{16}$ | 9.0519E-03 | 3.2425E-03 | 1.1481E-04 | 0.0000E+00 | 1.6834E-05 | -2.1159E-06 |

FIG. 13

| \multicolumn{7}{c}{f(Focal length)= 3.323mm, HFOV(Half angular field of view)= 34.553deg., Fno= 2.144, Image height=2.3mm, System length=4.735mm} |||||||
|---|---|---|---|---|---|---|---|
| Surface # | | Radius | Thickness | Refractive index | Abbe number | Focal length | Material |
| - | Object | ∞ | 400.0000 | | | | |
| 311 | 1st lens element | 3.9318 | 0.2961 | 1.643 | 22.437 | 15.906 | plastic |
| 312 | | 6.1690 | 0.1046 | | | | |
| 300 | Aperture stop | 0.0000 | -0.0572 | | | | |
| 321 | 2nd lens element | 5.1312 | 0.6078 | 1.535 | 55.712 | 3.136 | plastic |
| 322 | | -2.4019 | 0.5690 | | | | |
| 331 | 3rd lens element | -1.4770 | 0.2400 | 1.643 | 22.437 | -3.564 | plastic |
| 332 | | -4.3589 | 0.1499 | | | | |
| 341 | 4th lens element | -1.5870 | 0.3682 | 1.535 | 55.712 | 3.026 | plastic |
| 342 | | -0.8677 | 0.0600 | | | | |
| 351 | 5th lens element | 4.2798 | 0.4465 | 1.643 | 22.437 | -5.957 | plastic |
| 352 | | 1.9462 | 0.2947 | | | | |
| 361 | 6th lens element | 1.7596 | 0.5274 | 1.531 | 55.744 | -29.793 | plastic |
| 362 | | 1.4189 | 0.4000 | | | | |
| 371 | IR cut filter | ∞ | 0.2100 | 1.517 | 64.167 | | glass |
| 372 | | ∞ | 0.5166 | | | | |
| 380 | Image plane | ∞ | | | | | |

FIG. 16

| Aspherical parameters | | | | | | |
|---|---|---|---|---|---|---|
| Surface # | 311 | 312 | 321 | 322 | 331 | 332 |
| K | -2.8948E+01 | -4.3621E+01 | 0.0000E+00 | 4.7063E+00 | 3.5849E-01 | 7.9388E+00 |
| $a_4$ | -2.1571E-02 | 8.0397E-02 | 1.3390E-01 | -6.3729E-04 | -1.7317E-01 | -1.6006E-01 |
| $a_6$ | -4.3371E-02 | 7.6156E-02 | 1.2442E-02 | -5.2921E-02 | 1.8817E-01 | -5.2207E-03 |
| $a_8$ | -8.9946E-02 | -5.4215E-01 | -7.4594E-02 | 2.1729E-01 | 1.7068E-01 | 8.2151E-02 |
| $a_{10}$ | 1.7314E-01 | 9.4655E-01 | -1.0044E-01 | -1.9519E-01 | -2.3376E-01 | -8.8006E-04 |
| $a_{12}$ | -1.5567E-01 | -6.3058E-01 | -1.8647E-01 | -1.1535E-03 | 4.9619E-02 | -9.4149E-03 |
| $a_{14}$ | 1.9372E-02 | -3.6860E-01 | 7.5026E-01 | 9.7974E-02 | 1.7246E-02 | -1.2965E-03 |
| $a_{16}$ | 2.7781E-02 | 5.3771E-01 | -5.0788E-01 | -1.8298E-03 | 1.6256E-02 | 6.1552E-03 |
| Surface # | 341 | 342 | 351 | 352 | 361 | 362 |
| K | -2.8393E+00 | -1.1281E+00 | 4.9591E+00 | -1.3570E+01 | -2.5003E+00 | -3.0161E+00 |
| $a_4$ | -1.0928E-01 | 1.3924E-01 | -7.1630E-03 | -4.4323E-02 | -1.4453E-01 | -1.0436E-01 |
| $a_6$ | -3.8856E-02 | -1.5463E-01 | -1.7934E-02 | 2.0565E-02 | 1.0615E-02 | 2.3534E-02 |
| $a_8$ | 1.0261E-01 | 2.6698E-01 | 3.6836E-03 | -4.9411E-03 | 1.7730E-03 | -3.1969E-03 |
| $a_{10}$ | 1.3009E-02 | -1.1284E-01 | 1.3504E-04 | -1.6289E-04 | 7.8198E-04 | -1.6301E-04 |
| $a_{12}$ | 7.9192E-03 | -5.3646E-03 | -1.1600E-03 | -1.2348E-04 | 3.2787E-06 | 3.9812E-05 |
| $a_{14}$ | -1.3560E-04 | 6.5681E-03 | -6.8201E-05 | 4.3457E-05 | -7.0913E-05 | 6.0963E-06 |
| $a_{16}$ | -7.0103E-03 | 4.8818E-03 | 5.0871E-05 | 5.4193E-06 | 9.9134E-06 | -4.1897E-07 |

FIG. 17

| Surface # | | Radius | Thickness | Refractive index | Abbe number | Focal length | Material |
|---|---|---|---|---|---|---|---|
| | f(Focal length)= 3.001mm, HFOV(Half angular field of view)= 36.488deg., Fno= 2.134, Image height=2.3mm, System length=4.783mm | | | | | | |
| - | Object | ∞ | 400.0000 | | | | |
| 411 | 1st lens element | 1.8201 | 0.9993 | 1.535 | 55.712 | 8.962 | plastic |
| 412 | | 2.3662 | 0.1150 | | | | |
| 400 | Aperture stop | 0.0000 | -0.0037 | | | | |
| 421 | 2nd lens element | 4.4849 | 0.4859 | 1.535 | 55.712 | 3.224 | plastic |
| 422 | | -2.7114 | 0.2051 | | | | |
| 431 | 3rd lens element | -1.4769 | 0.3018 | 1.643 | 22.437 | -3.418 | plastic |
| 432 | | -4.7887 | 0.0689 | | | | |
| 441 | 4th lens element | -2.8680 | 0.4995 | 1.535 | 55.712 | 2.407 | plastic |
| 442 | | -0.9449 | 0.0598 | | | | |
| 451 | 5th lens element | 4.6196 | 0.2791 | 1.535 | 55.712 | -5.559 | plastic |
| 452 | | 1.7747 | 0.2000 | | | | |
| 461 | 6th lens element | 1.2899 | 0.4452 | 1.531 | 55.744 | -50.440 | plastic |
| 462 | | 1.0831 | 0.4000 | | | | |
| 471 | IR cut filter | ∞ | 0.2100 | 1.517 | 64.167 | | glass |
| 472 | | ∞ | 0.5178 | | | | |
| 480 | Image plane | ∞ | | | | | |

FIG. 20

| Aspherical parameters | | | | | | |
|---|---|---|---|---|---|---|
| Surface # | 411 | 412 | 421 | 422 | 431 | 432 |
| K | -9.5945E-01 | -3.8667E+00 | -1.7929E+02 | 7.1579E+00 | 1.0065E+00 | 1.9292E+01 |
| $a_4$ | 2.9892E-02 | 5.8539E-02 | 6.2480E-02 | -1.1663E-01 | -3.2610E-01 | -2.0828E-01 |
| $a_6$ | 1.0775E-02 | 3.8665E-02 | -1.0681E-01 | -1.1413E-01 | 2.3069E-01 | 1.1395E-02 |
| $a_8$ | -1.0194E-01 | -3.8279E-01 | -1.9354E-01 | 1.3749E-01 | 1.9821E-01 | 7.2597E-02 |
| $a_{10}$ | 1.8164E-01 | 9.2387E-01 | -2.6638E-01 | -1.9077E-01 | -3.3377E-01 | -1.8784E-02 |
| $a_{12}$ | -1.1473E-01 | -1.6271E+00 | -5.1562E-01 | -5.2532E-02 | 7.1451E-02 | -2.1367E-02 |
| $a_{14}$ | 1.0177E-02 | -1.9787E-01 | 5.3156E-01 | -6.6385E-02 | 3.3802E-02 | -3.9634E-03 |
| $a_{16}$ | 7.4832E-03 | 1.1957E+00 | -7.2623E-01 | 2.0742E-02 | -6.2184E-02 | 5.4458E-03 |
| Surface # | 441 | 442 | 451 | 452 | 461 | 462 |
| K | 5.8787E+00 | -8.9789E-01 | 7.3066E+00 | -7.9316E+00 | -4.1559E+00 | -3.6651E+00 |
| $a_4$ | -5.4335E-02 | 1.0190E-01 | -2.1827E-02 | -5.0680E-02 | -1.3196E-01 | -1.0548E-01 |
| $a_6$ | -1.2698E-01 | -9.2521E-02 | -1.5962E-02 | 1.8876E-02 | 1.9494E-02 | 2.6807E-02 |
| $a_8$ | 2.7115E-02 | 2.1517E-02 | 5.1739E-03 | -3.9785E-03 | 1.9222E-03 | -3.3682E-03 |
| $a_{10}$ | 7.5923E-03 | 8.2341E-03 | 3.1972E-04 | -8.0058E-05 | 2.3082E-04 | -1.8805E-04 |
| $a_{12}$ | 2.5476E-02 | 2.7015E-03 | -1.4821E-03 | -1.3242E-04 | -1.4698E-04 | 5.4951E-05 |
| $a_{14}$ | 1.9357E-02 | 2.5627E-03 | -1.0793E-04 | 1.3735E-05 | -8.3944E-05 | 1.0009E-05 |
| $a_{16}$ | 1.1672E-02 | 1.8913E-03 | 7.1385E-05 | 0.0000E+00 | 1.4280E-05 | -2.1952E-06 |

FIG. 21

| Surface # | | Radius | Thickness | Refractive index | Abbe number | Focal length | Material |
|---|---|---|---|---|---|---|---|
| | f(Focal length)= 2.823mm, HFOV(Half angular field of view)= 38.911deg., Fno= 2.067, Image height=2.3mm, System length=4.344mm | | | | | | |
| - | Object | ∞ | 400.0000 | | | | |
| 511 | 1st lens element | 3.7356 | 0.2631 | 1.643 | 22.437 | 9.901 | plastic |
| 512 | | 8.6954 | 0.1325 | | | | |
| 500 | Aperture stop | 0.0000 | -0.0448 | | | | |
| 521 | 2nd lens element | 6.0608 | 0.6280 | 1.535 | 55.712 | 3.250 | plastic |
| 522 | | -2.3613 | 0.4100 | | | | |
| 531 | 3rd lens element | -1.2916 | 0.2957 | 1.643 | 22.437 | -3.371 | plastic |
| 532 | | -3.4449 | 0.0699 | | | | |
| 541 | 4th lens element | -1.9699 | 0.4224 | 1.535 | 55.712 | 2.447 | plastic |
| 542 | | -0.8471 | 0.0599 | | | | |
| 551 | 5th lens element | 4.0935 | 0.2800 | 1.535 | 55.712 | -4.624 | plastic |
| 552 | | 1.5082 | 0.1488 | | | | |
| 561 | 6th lens element | 1.2456 | 0.5176 | 1.531 | 55.744 | 98.599 | plastic |
| 562 | | 1.0915 | 0.4000 | | | | |
| 571 | IR cut filter | ∞ | 0.2100 | 1.517 | 64.167 | | glass |
| 572 | | ∞ | 0.5563 | | | | |
| 580 | Image plane | ∞ | | | | | |

FIG. 24

| Aspherical parameters | | | | | | |
|---|---|---|---|---|---|---|
| Surface # | 511 | 512 | 521 | 522 | 531 | 532 |
| K | -2.3247E+01 | -1.1155E+02 | 5.9117E+01 | 5.8819E+00 | 2.3393E-01 | 3.1067E-01 |
| $a_4$ | 7.2983E-02 | 2.2077E-01 | 1.4157E-01 | -8.0887E-02 | -2.7156E-01 | -1.5043E-01 |
| $a_6$ | 1.8651E-02 | 1.8912E-01 | -6.8977E-02 | -4.4430E-02 | 3.0726E-01 | -1.9192E-02 |
| $a_8$ | -1.1151E-01 | -5.3728E-01 | -1.6271E-01 | 1.6229E-01 | 2.4605E-01 | 8.9443E-02 |
| $a_{10}$ | 1.3030E-01 | 7.9017E-01 | -1.5042E-01 | -1.9117E-01 | -3.0824E-01 | 3.6490E-03 |
| $a_{12}$ | -1.8585E-01 | -7.1817E-01 | -2.0745E-01 | -4.3451E-02 | 1.0117E-01 | -1.2933E-02 |
| $a_{14}$ | 7.5784E-03 | -1.5911E-01 | 7.6382E-01 | 8.3686E-02 | 7.4025E-02 | 1.4186E-03 |
| $a_{16}$ | 7.8231E-02 | 3.9505E-01 | -1.8280E+00 | 3.4355E-04 | 9.3420E-04 | 2.4016E-02 |
| Surface # | 541 | 542 | 551 | 552 | 561 | 562 |
| K | -3.5744E+00 | -1.0613E+00 | 4.3674E+00 | -5.8467E+00 | -3.4031E+00 | -3.6732E+00 |
| $a_4$ | -6.5060E-02 | 1.2886E-01 | -1.6547E-02 | -6.3587E-02 | -1.2879E-01 | -9.7243E-02 |
| $a_6$ | -3.6916E-02 | -1.4024E-01 | -1.5962E-02 | 2.1001E-02 | 1.7871E-02 | 2.5939E-02 |
| $a_8$ | 7.1717E-02 | 2.9412E-01 | 3.8979E-03 | -3.6488E-03 | 1.5516E-03 | -3.3039E-03 |
| $a_{10}$ | 1.1336E-02 | -1.0189E-01 | 3.1038E-04 | -1.3109E-04 | 2.3187E-04 | -2.0005E-04 |
| $a_{12}$ | 2.0345E-02 | -7.7896E-03 | -9.9759E-04 | -1.4965E-04 | -1.2631E-04 | 4.4554E-05 |
| $a_{14}$ | 5.5551E-03 | -2.2694E-03 | 1.1270E-06 | 7.5460E-06 | -7.5161E-05 | 8.2157E-06 |
| $a_{16}$ | -1.6133E-02 | 3.4658E-03 | 1.3040E-05 | 4.5915E-06 | 1.8933E-05 | -1.3541E-06 |

FIG. 25

| f(Focal length)= 2.592mm, HFOV(Half angular field of view)= 41.581deg., Fno= 2.054, Image height=2.3mm, System length=4.633mm ||||||||
|---|---|---|---|---|---|---|---|
| Surface # | | Radius | Thickness | Refractive index | Abbe number | Focal length | Material |
| - | Object | ∞ | 400.0000 | | | | |
| 611 | 1st lens element | 8.4887 | 0.2496 | 1.535 | 55.712 | 43.526 | plastic |
| 612 | | 13.1956 | 0.4454 | | | | |
| 600 | Aperture stop | 0.0000 | 0.0146 | | | | |
| 621 | 2nd lens element | 6.4531 | 0.5079 | 1.535 | 55.712 | 3.130 | plastic |
| 622 | | -2.2092 | 0.3472 | | | | |
| 631 | 3rd lens element | -1.0096 | 0.2389 | 1.643 | 22.437 | -3.108 | plastic |
| 632 | | -2.2133 | 0.0699 | | | | |
| 641 | 4th lens element | -4.1306 | 0.4341 | 1.535 | 55.712 | 2.305 | plastic |
| 642 | | -0.9870 | 0.0600 | | | | |
| 651 | 5th lens element | 2.9849 | 0.2497 | 1.535 | 55.712 | -6.528 | plastic |
| 652 | | 1.5648 | 0.0597 | | | | |
| 661 | 6th lens element | 1.2081 | 0.3442 | 1.531 | 55.744 | 15.357 | plastic |
| 662 | | 1.2770 | 0.4000 | | | | |
| 671 | IR cut filter | ∞ | 0.2100 | 1.517 | 64.167 | | glass |
| 672 | | ∞ | 1.0013 | | | | |
| 680 | Image plane | ∞ | | | | | |

FIG. 28

| Aspherical parameters | | | | | | |
|---|---|---|---|---|---|---|
| Surface # | 611 | 612 | 621 | 622 | 631 | 632 |
| K | 3.8480E+01 | 2.3153E+02 | 1.0892E+01 | 4.9027E+00 | -6.9001E-01 | -4.0507E+00 |
| $a_4$ | 1.4913E-01 | 2.5662E-01 | 6.5145E-02 | 4.2712E-03 | -1.4537E-02 | -1.4837E-01 |
| $a_6$ | 6.0994E-02 | 2.0458E-01 | -4.0926E-02 | -7.9253E-02 | 1.1281E-02 | -2.5173E-02 |
| $a_8$ | -7.5182E-02 | -4.3646E-01 | -1.6114E-01 | 1.5854E-01 | 1.9825E-02 | 1.5161E-02 |
| $a_{10}$ | 1.6132E-01 | 9.5229E-01 | -1.5567E-01 | -2.7291E-01 | 3.1447E-02 | 9.8372E-03 |
| $a_{12}$ | -1.5015E-01 | -5.2291E-01 | -2.1880E-01 | -1.6343E-01 | 4.0399E-02 | 2.6983E-03 |
| $a_{14}$ | 1.5755E-02 | -1.5843E-01 | 8.1020E-01 | 4.6631E-02 | 3.4747E-02 | -2.1713E-03 |
| $a_{16}$ | -8.6141E-03 | -3.8429E-01 | -6.5886E-01 | 4.4642E-01 | -3.0848E-05 | -2.9565E-03 |
| Surface # | 641 | 642 | 651 | 652 | 661 | 662 |
| K | -1.2842E+01 | -9.5022E-01 | -1.0758E+00 | -3.6888E+00 | -2.3756E+00 | -2.5426E+00 |
| $a_4$ | -9.7984E-02 | 1.2860E-01 | -1.6867E-02 | -6.7558E-02 | -1.1817E-01 | -1.0197E-01 |
| $a_6$ | -6.1782E-02 | -9.0161E-02 | -1.9474E-02 | 2.0713E-02 | 1.4250E-02 | 2.6083E-02 |
| $a_8$ | -8.9789E-03 | 2.3347E-02 | 7.7136E-03 | -3.5302E-03 | 2.3829E-04 | -3.6315E-03 |
| $a_{10}$ | -4.3271E-03 | 1.5037E-02 | 1.5918E-03 | -2.2063E-06 | -1.6581E-05 | -3.5545E-04 |
| $a_{12}$ | 3.2970E-03 | 9.4407E-03 | -1.3595E-03 | -1.2062E-04 | -1.4081E-04 | 7.4129E-05 |
| $a_{14}$ | 1.0696E-02 | 5.5107E-03 | 2.6020E-05 | -3.1007E-05 | -3.7832E-05 | 2.1044E-05 |
| $a_{16}$ | 1.6083E-02 | 2.6168E-03 | -4.4744E-05 | -1.6271E-05 | 2.8502E-05 | -2.2716E-07 |

FIG. 29

| f(Focal length)= 2.387mm, HFOV(Half angular field of view)= 42.999deg., Fno= 2.000, Image height=2.3mm, System length=4.433mm ||||||||
|---|---|---|---|---|---|---|---|
| Surface # | | Radius | Thickness | Refractive index | Abbe number | Focal length | Material |
| - | Object | ∞ | 400.0000 | | | | |
| 711 | 1st lens element | 8.8306 | 0.2511 | 1.643 | 22.437 | 47.071 | plastic |
| 712 | | 12.2906 | 0.2740 | | | | |
| 700 | Aperture stop | 0.0000 | -0.0305 | | | | |
| 721 | 2nd lens element | 3.2410 | 0.5339 | 1.535 | 55.712 | 2.307 | plastic |
| 722 | | -1.8887 | 0.3084 | | | | |
| 731 | 3rd lens element | -1.1607 | 0.2399 | 1.643 | 22.437 | -2.462 | plastic |
| 732 | | -4.6086 | 0.0697 | | | | |
| 741 | 4th lens element | -2.7698 | 0.7365 | 1.535 | 55.712 | 1.856 | plastic |
| 742 | | -0.8008 | 0.0599 | | | | |
| 751 | 5th lens element | 2.0397 | 0.3530 | 1.643 | 22.437 | -6.015 | plastic |
| 752 | | 1.2478 | 0.3498 | | | | |
| 761 | 6th lens element | 3.1738 | 0.3237 | 1.531 | 55.744 | -15.675 | plastic |
| 762 | | 2.2184 | 0.3000 | | | | |
| 771 | IR cut filter | ∞ | 0.2100 | 1.517 | 64.167 | | glass |
| 772 | | ∞ | 0.4520 | | | | |
| 780 | Image plane | ∞ | | | | | |

FIG. 32

| Aspherical parameters | | | | | | |
|---|---|---|---|---|---|---|
| Surface # | 711 | 712 | 721 | 722 | 731 | 732 |
| K | 0.0000E+00 | 0.0000E+00 | 0.0000E+00 | 4.5495E+00 | 0.0000E+00 | 0.0000E+00 |
| $a_4$ | 6.4170E-02 | 1.6458E-01 | 4.1961E-02 | 1.2620E-02 | -3.1837E-01 | -2.1905E-01 |
| $a_6$ | 7.4796E-02 | 9.4563E-02 | -9.7761E-03 | -2.4283E-01 | 3.2569E-01 | 4.3115E-02 |
| $a_8$ | -2.2247E-01 | -3.2011E-01 | -4.1745E-01 | 3.4714E-01 | 7.7401E-02 | 3.1930E-02 |
| $a_{10}$ | 7.3426E-02 | -2.1431E-01 | -2.5222E-01 | -7.2947E-02 | -4.4961E-02 | 2.0227E-02 |
| $a_{12}$ | -3.2850E-02 | 2.2301E-01 | -1.2214E+00 | -6.7046E-01 | 0.0000E+00 | 0.0000E+00 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 741 | 742 | 751 | 752 | 761 | 762 |
| K | 0.0000E+00 | -1.4473E+00 | 0.0000E+00 | -6.7872E+00 | -4.1813E+00 | -2.6918E-02 |
| $a_4$ | -7.5692E-02 | 9.6829E-02 | -1.0216E-01 | -3.8609E-02 | -1.1277E-01 | -1.5262E-01 |
| $a_6$ | 2.1002E-02 | -2.3209E-01 | 1.9935E-02 | 9.1616E-03 | 2.2094E-02 | 3.2216E-02 |
| $a_8$ | 1.8551E-02 | 2.7953E-01 | -3.7343E-03 | -2.4339E-03 | 7.2221E-04 | -2.8144E-03 |
| $a_{10}$ | 2.9908E-02 | -6.7873E-02 | -4.0409E-04 | 5.2475E-04 | 2.5167E-04 | -2.8227E-04 |
| $a_{12}$ | 0.0000E+00 | 0.0000E+00 | 8.1518E-05 | -6.3653E-05 | -2.3547E-05 | 2.4363E-05 |
| $a_{14}$ | 0.0000E+00 | 0.0000E+00 | 0.0000E+00 | 0.0000E+00 | -6.7769E-05 | 2.0590E-05 |
| $a_{16}$ | 0.0000E+00 | 0.0000E+00 | 0.0000E+00 | 0.0000E+00 | 1.0067E-05 | -4.1667E-06 |

FIG. 33

| Surface # | | Radius | Thickness | Refractive index | Abbe number | Focal length | Material |
|---|---|---|---|---|---|---|---|
| | f(Focal length)= 2.838mm, HFOV(Half angular field of view)= 39.495deg., Fno= 2.000, Image height=2.3mm, System length=4.637mm | | | | | | |
| - | Object | ∞ | 400.0000 | | | | |
| 811 | 1st lens element | 2.1462 | 0.4055 | 1.643 | 22.437 | 7.695 | plastic |
| 812 | | 4.1724 | 0.2043 | | | | |
| 800 | Aperture stop | 0.0000 | 0.0854 | | | | |
| 821 | 2nd lens element | 22.1023 | 0.6663 | 1.643 | 22.437 | 3.529 | plastic |
| 822 | | -2.0499 | 0.0893 | | | | |
| 831 | 3rd lens element | -1.3085 | 0.2391 | 1.535 | 55.712 | -2.930 | plastic |
| 832 | | -4.5119 | 0.0832 | | | | |
| 841 | 4th lens element | -1.9828 | 0.4361 | 1.643 | 22.437 | 2.168 | plastic |
| 842 | | -0.7897 | 0.0512 | | | | |
| 851 | 5th lens element | 3.1366 | 0.5986 | 1.643 | 22.437 | -4.272 | plastic |
| 852 | | 1.2365 | 0.1424 | | | | |
| 861 | 6th lens element | 2.6091 | 0.2795 | 1.531 | 55.744 | 29.095 | plastic |
| 862 | | 3.0202 | 0.3000 | | | | |
| 871 | IR cut filter | ∞ | 0.2100 | 1.517 | 64.167 | | glass |
| 872 | | ∞ | 0.8484 | | | | |
| 880 | Image plane | ∞ | | | | | |

FIG. 36

| Aspherical parameters | | | | | | |
|---|---|---|---|---|---|---|
| Surface # | 811 | 812 | 821 | 822 | 831 | 832 |
| K | 0.0000E+00 | 0.0000E+00 | 0.0000E+00 | 3.2421E+00 | 0.0000E+00 | 0.0000E+00 |
| $a_4$ | 2.4707E-02 | 2.2505E-02 | -2.4767E-02 | -1.4664E-01 | -2.7492E-01 | -1.5214E-01 |
| $a_6$ | 6.2536E-02 | 1.5621E-01 | -5.2016E-02 | -5.6356E-02 | 1.6784E-01 | -5.9829E-02 |
| $a_8$ | -2.0116E-01 | -5.6252E-02 | -1.3922E-01 | 1.2319E-01 | 8.9320E-02 | 1.0554E-01 |
| $a_{10}$ | 3.7903E-01 | -4.2733E-01 | 2.0999E-01 | -2.7216E-01 | -2.2889E-02 | -5.6066E-02 |
| $a_{12}$ | -2.6494E-01 | 1.5684E-01 | -1.1980E+00 | 8.7247E-02 | -1.3229E-02 | 1.9500E-03 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 841 | 842 | 851 | 852 | 861 | 862 |
| K | 0.0000E+00 | -1.1482E+00 | 0.0000E+00 | -7.0113E+00 | -6.3967E+00 | 1.2005E+00 |
| $a_4$ | -1.0513E-01 | 1.0883E-01 | -3.1450E-03 | -3.2263E-02 | -4.1642E-02 | -4.5187E-02 |
| $a_6$ | 2.3443E-02 | -2.0946E-01 | -2.7534E-02 | 1.6541E-02 | 2.4190E-03 | 2.5096E-03 |
| $a_8$ | -1.0381E-02 | 2.9277E-01 | 3.5793E-03 | -9.3192E-03 | 8.5057E-04 | -2.4387E-04 |
| $a_{10}$ | 3.5913E-02 | -9.2944E-02 | -7.5745E-04 | 3.8958E-04 | 2.2099E-04 | 1.1276E-04 |
| $a_{12}$ | -1.4074E-03 | 6.8295E-05 | -8.9759E-04 | 2.7687E-04 | 3.5124E-05 | 1.1225E-05 |
| $a_{14}$ | 0.0000E+00 | 0.0000E+00 | 0.0000E+00 | 0.0000E+00 | -3.8735E-06 | -3.5577E-06 |
| $a_{16}$ | 0.0000E+00 | 0.0000E+00 | 0.0000E+00 | 0.0000E+00 | -8.0157E-06 | -4.7935E-06 |

FIG. 37

| Surface # | | Radius | Thickness | Refractive index | Abbe number | Focal length | Material |
|---|---|---|---|---|---|---|---|
| | f(Focal length)= 2.881mm, HFOV(Half angular field of view)= 38.378deg., Fno= 2.081, Image height=2.3mm, System length=4.348mm | | | | | | |
| - | Object | ∞ | 400.0000 | | | | |
| 911 | 1st lens element | 4.4970 | 0.2500 | 1.643 | 22.437 | 10.701 | plastic |
| 912 | | 12.5183 | 0.1337 | | | | |
| 900 | Aperture stop | 0.0000 | -0.0460 | | | | |
| 921 | 2nd lens element | 6.1713 | 0.6132 | 1.535 | 55.712 | 3.297 | plastic |
| 922 | | -2.3958 | 0.4892 | | | | |
| 931 | 3rd lens element | -1.2799 | 0.2398 | 1.643 | 22.437 | -3.413 | plastic |
| 932 | | -3.2631 | 0.0700 | | | | |
| 941 | 4th lens element | -1.8338 | 0.4186 | 1.535 | 55.712 | 2.425 | plastic |
| 942 | | -0.8220 | 0.0600 | | | | |
| 951 | 5th lens element | 4.2176 | 0.2800 | 1.535 | 55.712 | -4.332 | plastic |
| 952 | | 1.4642 | 0.1515 | | | | |
| 961 | 6th lens element | 1.2044 | 0.5067 | 1.531 | 55.744 | 50.393 | plastic |
| 962 | | 1.0766 | 0.4000 | | | | |
| 971 | IR cut filter | ∞ | 0.2100 | 1.517 | 64.167 | | glass |
| 972 | | ∞ | 0.5701 | | | | |
| 980 | Image plane | ∞ | | | | | |

FIG. 40

| Aspherical parameters | | | | | | |
|---|---|---|---|---|---|---|
| Surface # | 911 | 912 | 921 | 922 | 931 | 932 |
| K | -6.2165E+01 | -3.1085E+02 | 5.5423E+01 | 5.6440E+00 | 2.5261E-01 | 1.0900E+00 |
| $a_4$ | 6.1652E-02 | 1.8739E-01 | 1.4715E-01 | -5.1889E-02 | -2.8075E-01 | -1.5404E-01 |
| $a_6$ | -5.0475E-04 | 1.5182E-01 | -7.3641E-02 | -6.4443E-02 | 3.0180E-01 | -1.8311E-02 |
| $a_8$ | -1.2817E-01 | -5.3966E-01 | -1.7852E-01 | 1.5223E-01 | 2.5469E-01 | 8.5967E-02 |
| $a_{10}$ | 1.4093E-01 | 8.0280E-01 | -1.4208E-01 | -1.7494E-01 | -3.0042E-01 | 4.0395E-03 |
| $a_{12}$ | -1.4711E-01 | -7.2333E-01 | -1.2488E-01 | -1.5051E-02 | 1.0337E-01 | -1.0350E-02 |
| $a_{14}$ | 4.1156E-02 | -1.6400E-01 | 9.6215E-01 | 9.2049E-02 | 7.0416E-02 | 2.2288E-03 |
| $a_{16}$ | 3.1404E-02 | 6.5580E-01 | -1.5478E+00 | -4.7645E-02 | -9.3956E-03 | 2.0731E-02 |
| Surface # | 941 | 942 | 951 | 952 | 961 | 962 |
| K | -5.5377E+00 | -1.1278E+00 | 3.9842E+00 | -7.8335E+00 | -3.4109E+00 | -3.5621E+00 |
| $a_4$ | -6.6695E-02 | 1.3713E-01 | -1.0963E-02 | -6.0258E-02 | -1.3576E-01 | -9.5421E-02 |
| $a_6$ | -4.0280E-02 | -1.4657E-01 | -1.5595E-02 | 2.0925E-02 | 1.6754E-02 | 2.5002E-02 |
| $a_8$ | 7.0610E-02 | 2.8921E-01 | 4.1251E-03 | -3.9076E-03 | 1.5397E-03 | -3.3119E-03 |
| $a_{10}$ | 7.0127E-03 | -1.0183E-01 | 3.2404E-04 | -1.9136E-04 | 2.7291E-04 | -1.7283E-04 |
| $a_{12}$ | 1.6318E-02 | -6.2349E-03 | -9.9347E-04 | -1.5395E-04 | -1.1095E-04 | 5.0090E-05 |
| $a_{14}$ | 5.2279E-03 | -1.3694E-03 | 1.6519E-05 | 8.6725E-06 | -7.1799E-05 | 8.5379E-06 |
| $a_{16}$ | -1.1893E-02 | 3.3118E-03 | 2.8441E-05 | 4.4921E-06 | 1.8994E-05 | -1.5689E-06 |

FIG. 41

| Surface # | | Radius | Thickness | Refractive index | Abbe number | Focal length | Material |
|---|---|---|---|---|---|---|---|
| | f(Focal length)= 2.607mm, HFOV(Half angular field of view)= 41.088deg., Fno= 2.067, Image height=2.3mm, System length=4.280mm | | | | | | |
| - | Object | ∞ | 400.0000 | | | | |
| 1011 | 1st lens element | 2.6568 | 0.4718 | 1.535 | 55.712 | 7.437 | plastic |
| 1012 | | 7.4497 | 0.0928 | | | | |
| 1000 | Aperture stop | 0.0000 | -0.0215 | | | | |
| 1021 | 2nd lens element | 7.1451 | 0.5536 | 1.535 | 55.712 | 3.209 | plastic |
| 1022 | | -2.2084 | 0.2554 | | | | |
| 1031 | 3rd lens element | -1.2509 | 0.2773 | 1.643 | 22.437 | -3.160 | plastic |
| 1032 | | -3.4959 | 0.0682 | | | | |
| 1041 | 4th lens element | -1.9755 | 0.4312 | 1.535 | 55.712 | 2.427 | plastic |
| 1042 | | -0.8450 | 0.0598 | | | | |
| 1051 | 5th lens element | 4.8117 | 0.4994 | 1.535 | 55.712 | -5.022 | plastic |
| 1052 | | 1.6652 | 0.1011 | | | | |
| 1061 | 6th lens element | 1.4300 | 0.3988 | 1.531 | 55.744 | 46.362 | plastic |
| 1062 | | 1.3707 | 0.4000 | | | | |
| 1071 | IR cut filter | ∞ | 0.2100 | 1.517 | 64.167 | | glass |
| 1072 | | ∞ | 0.4819 | | | | |
| 1080 | Image plane | ∞ | | | | | |

FIG. 44

| Aspherical parameters | | | | | | |
|---|---|---|---|---|---|---|
| Surface # | 1011 | 1012 | 1021 | 1022 | 1031 | 1032 |
| K | -8.3248E+00 | -2.0996E+01 | 8.5358E+01 | 6.5209E+00 | 2.6797E-01 | -3.8939E+00 |
| $a_4$ | 6.7430E-02 | 2.1510E-01 | 1.5445E-01 | -6.2437E-02 | -2.5960E-01 | -1.3830E-01 |
| $a_6$ | -3.0152E-03 | 2.5920E-01 | -3.7964E-02 | -4.7831E-03 | 3.4136E-01 | -3.6760E-02 |
| $a_8$ | -9.4572E-02 | -5.8796E-01 | -1.7644E-01 | 1.5222E-01 | 2.2824E-01 | 8.1744E-02 |
| $a_{10}$ | 1.5642E-01 | 5.7453E-01 | -3.3461E-01 | -2.8260E-01 | -3.6143E-01 | -6.0844E-04 |
| $a_{12}$ | -1.7171E-01 | -1.3164E+00 | -9.3076E-01 | -1.9121E-01 | 3.9076E-02 | -1.9827E-02 |
| $a_{14}$ | -5.1126E-03 | -9.3374E-01 | -8.6391E-01 | -6.3678E-02 | 1.4843E-02 | -1.1653E-02 |
| $a_{16}$ | 9.2892E-03 | -2.6299E+00 | -6.3179E+00 | -4.0870E-02 | -5.9751E-02 | 2.2294E-03 |
| Surface # | 1041 | 1042 | 1051 | 1052 | 1061 | 1062 |
| K | -2.6632E+00 | -9.3807E-01 | 3.2021E+00 | -4.1656E+00 | -2.7006E+00 | -3.4801E+00 |
| $a_4$ | -7.7242E-02 | 1.0696E-01 | -2.7796E-02 | -7.1942E-02 | -1.1853E-01 | -1.0417E-01 |
| $a_6$ | -3.4607E-02 | -1.4007E-01 | -1.7402E-02 | 2.0552E-02 | 1.8316E-02 | 2.6782E-02 |
| $a_8$ | 6.3491E-02 | 3.0558E-01 | 4.0272E-03 | -3.0816E-03 | 1.2469E-03 | -3.3966E-03 |
| $a_{10}$ | 4.8643E-03 | -9.2554E-02 | 4.7869E-04 | 4.0968E-05 | 1.1479E-04 | -2.3085E-04 |
| $a_{12}$ | 1.4923E-02 | -1.8425E-03 | -1.2279E-03 | -1.1805E-04 | -1.5345E-04 | 4.2788E-05 |
| $a_{14}$ | 7.4239E-03 | 1.1519E-03 | -1.2050E-04 | 5.4956E-06 | -7.7624E-05 | 9.1146E-06 |
| $a_{16}$ | -3.5144E-03 | 4.4056E-03 | -4.0682E-05 | 2.4189E-07 | 2.0194E-05 | -1.1556E-06 |

FIG. 45

| \multicolumn{7}{|c|}{f(Focal length)= 2.830mm, HFOV(Half angular field of view)= 39.111deg., Fno= 2.045, Image height=2.3mm, System length=4.749mm} |
|---|---|---|---|---|---|---|---|
| Surface # | | Radius | Thickness | Refractive index | Abbe number | Focal length | Material |
| - | Object | ∞ | 400.0000 | | | | |
| 1111 | 1st lens element | 8.0986 | 0.3352 | 1.643 | 22.43732 | 26.05452 | plastic |
| 1112 | | 15.3132 | 0.3446 | | | | |
| 1100 | Aperture stop | 0.0000 | -0.1046 | | | | |
| 1121 | 2nd lens element | 2.7238 | 0.5531 | 1.535 | 55.71236 | 3.482116 | plastic |
| 1122 | | -5.5347 | 0.3072 | | | | |
| 1131 | 3rd lens element | -2.1781 | 0.3917 | 1.535049 | 55.71236 | 3.241649 | plastic |
| 1132 | | -1.0281 | 0.1022 | | | | |
| 1141 | 4th lens element | -0.7133 | 0.3637 | 1.643 | 22.43732 | -5.01228 | plastic |
| 1142 | | -1.0972 | 0.0600 | | | | |
| 1151 | 5th lens element | 2.0759 | 0.3944 | 1.643 | 22.43732 | -6.43917 | plastic |
| 1152 | | 1.2826 | 0.2000 | | | | |
| 1161 | 6th lens element | 1.4989 | 0.8219 | 1.531 | 55.74414 | 6.291655 | plastic |
| 1162 | | 2.1940 | 0.3000 | | | | |
| 1171 | IR cut filter | ∞ | 0.2100 | 1.517 | 64.16734 | | glass |
| 1172 | | ∞ | 0.4699 | | | | |
| 1180 | Image plane | ∞ | | | | | |

FIG. 48

| Aspherical parameters | | | | | | |
|---|---|---|---|---|---|---|
| Surface # | 1111 | 1112 | 1121 | 1122 | 1131 | 1132 |
| K | 0.0000E+00 | 0.0000E+00 | 0.0000E+00 | 0.0000E+00 | 0.0000E+00 | 0.0000E+00 |
| $a_4$ | 1.5279E-01 | 3.7122E-01 | 1.7911E-01 | -1.1051E-01 | -1.5482E-01 | -6.4988E-03 |
| $a_6$ | 3.6400E-03 | -1.1460E-01 | 1.5617E-02 | -7.9917E-02 | -3.5022E-01 | -8.0695E-02 |
| $a_8$ | -4.0460E-02 | 3.7010E-01 | -4.7015E-01 | -7.0251E-02 | 3.2457E-01 | 5.3975E-01 |
| $a_{10}$ | 2.7580E-02 | -6.7179E-01 | 6.9681E-01 | 0.0000E+00 | 0.0000E+00 | 2.9386E-01 |
| $a_{12}$ | -7.8485E-03 | 6.2281E-01 | -4.9280E-01 | 0.0000E+00 | 0.0000E+00 | -5.7914E-01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 1141 | 1142 | 1151 | 1152 | 1161 | 1162 |
| K | -4.7907E-01 | -7.3547E-01 | 0.0000E+00 | -4.7322E+00 | -8.0421E+00 | 3.6086E-02 |
| $a_4$ | 2.1694E-01 | -5.8485E-02 | -1.7595E-01 | -6.6157E-02 | -1.1327E-01 | -1.3530E-01 |
| $a_6$ | 1.3812E-01 | 2.4722E-01 | -1.2325E-02 | 2.1267E-03 | 2.1021E-02 | 1.5800E-02 |
| $a_8$ | 6.2036E-01 | -2.8292E-01 | 1.7147E-02 | 5.0182E-04 | -3.2153E-04 | -1.2203E-03 |
| $a_{10}$ | -3.0983E-01 | 2.0522E-01 | 8.6792E-03 | 1.2189E-03 | 1.3945E-04 | -3.9069E-04 |
| $a_{12}$ | 0.0000E+00 | 0.0000E+00 | -1.7686E-02 | -7.2185E-04 | 1.3952E-04 | 1.1503E-04 |
| $a_{14}$ | 0.0000E+00 | 0.0000E+00 | 5.9375E-03 | 1.3628E-04 | -3.9590E-05 | -2.1948E-05 |
| $a_{16}$ | 0.0000E+00 | 0.0000E+00 | 0.0000E+00 | 0.0000E+00 | 3.8651E-07 | 1.6702E-06 |

FIG. 49

| Embodiment | 1st | 2nd | 3rd | 4th | 5th | 6th | 7th | 8th | 9th | 10th | 11th |
|---|---|---|---|---|---|---|---|---|---|---|---|
| T1 | 0.365 | 0.728 | 0.296 | 0.999 | 0.263 | 0.25 | 0.251 | 0.405 | 0.25 | 0.472 | 0.335 |
| G12 | 0.077 | 0.22 | 0.048 | 0.111 | 0.087 | 0.46 | 0.244 | 0.29 | 0.088 | 0.072 | 0.24 |
| T2 | 0.748 | 0.547 | 0.608 | 0.486 | 0.628 | 0.508 | 0.534 | 0.666 | 0.613 | 0.554 | 0.553 |
| G23 | 0.286 | 0.37 | 0.569 | 0.205 | 0.41 | 0.347 | 0.308 | 0.089 | 0.489 | 0.255 | 0.307 |
| T3 | 0.461 | 0.24 | 0.24 | 0.302 | 0.296 | 0.239 | 0.24 | 0.239 | 0.24 | 0.277 | 0.392 |
| G34 | 0.13 | 0.138 | 0.15 | 0.069 | 0.07 | 0.07 | 0.07 | 0.083 | 0.07 | 0.068 | 0.102 |
| T4 | 0.484 | 0.365 | 0.368 | 0.499 | 0.422 | 0.434 | 0.737 | 0.436 | 0.419 | 0.431 | 0.364 |
| G45 | 0.06 | 0.06 | 0.06 | 0.06 | 0.06 | 0.06 | 0.06 | 0.051 | 0.06 | 0.06 | 0.06 |
| T5 | 0.362 | 0.29 | 0.447 | 0.279 | 0.28 | 0.25 | 0.353 | 0.599 | 0.28 | 0.499 | 0.394 |
| G56 | 0.2 | 0.335 | 0.295 | 0.2 | 0.149 | 0.06 | 0.35 | 0.142 | 0.152 | 0.101 | 0.2 |
| T6 | 0.437 | 0.465 | 0.527 | 0.445 | 0.518 | 0.344 | 0.324 | 0.279 | 0.507 | 0.399 | 0.822 |
| G6F | 0.4 | 0.4 | 0.4 | 0.4 | 0.4 | 0.4 | 0.3 | 0.3 | 0.4 | 0.4 | 0.3 |
| TF | 0.21 | 0.21 | 0.21 | 0.21 | 0.21 | 0.21 | 0.21 | 0.21 | 0.21 | 0.21 | 0.21 |
| GFP | 0.541 | 0.501 | 0.517 | 0.518 | 0.556 | 1.001 | 0.452 | 0.848 | 0.57 | 0.482 | 0.47 |
| ALT | 2.857 | 2.635 | 2.486 | 3.010 | 2.407 | 2.025 | 2.439 | 2.624 | 2.309 | 2.632 | 2.860 |
| AAG | 0.753 | 1.123 | 1.122 | 0.645 | 0.776 | 0.997 | 1.032 | 0.655 | 0.859 | 0.556 | 0.909 |
| BFL | 1.151 | 1.111 | 1.127 | 1.128 | 1.166 | 1.611 | 0.962 | 1.358 | 1.180 | 1.092 | 0.980 |
| TTL | 4.761 | 4.869 | 4.735 | 4.783 | 4.349 | 4.633 | 4.433 | 4.637 | 4.348 | 4.280 | 4.749 |
| EFL | 3.219 | 3.645 | 3.323 | 3.001 | 2.823 | 2.592 | 2.387 | 2.838 | 2.881 | 2.607 | 2.83 |
| V1 | 55.7124 | 55.7124 | 22.4373 | 55.7124 | 22.4373 | 55.71236 | 22.43732 | 22.43732 | 22.43732 | 55.71236 | 22.43732 |
| V5 | 55.7124 | 55.7124 | 22.4373 | 55.7124 | 55.7124 | 55.71236 | 22.43732 | 22.43732 | 55.71236 | 55.71236 | 22.43732 |
| EFL/G12 | 41.81 | 16.57 | 69.23 | 27.04 | 32.45 | 5.63 | 9.78 | 9.79 | 32.74 | 36.208 | 11.792 |
| ALT/T1 | 7.83 | 3.62 | 8.40 | 3.01 | 9.15 | 8.10 | 9.72 | 6.48 | 9.24 | 5.576 | 8.537 |
| EFL/T4 | 6.65 | 9.99 | 9.03 | 6.01 | 6.69 | 5.97 | 3.24 | 6.51 | 6.88 | 6.049 | 7.775 |
| T1/G12 | 4.74 | 3.31 | 6.17 | 9.00 | 3.02 | 0.54 | 1.03 | 1.40 | 2.84 | 6.556 | 1.396 |
| T3/G12 | 5.99 | 1.09 | 5.00 | 2.72 | 3.40 | 0.52 | 0.98 | 0.82 | 2.73 | 3.847 | 1.633 |
| T2/T1 | 2.05 | 0.75 | 2.05 | 0.49 | 2.39 | 2.03 | 2.13 | 1.64 | 2.45 | 1.174 | 1.651 |
| EFL/T1 | 8.82 | 5.01 | 11.23 | 3.00 | 10.73 | 10.37 | 9.51 | 7.01 | 11.52 | 5.523 | 8.448 |
| T5/G12 | 4.70 | 1.32 | 9.31 | 2.51 | 3.22 | 0.54 | 1.45 | 2.07 | 3.18 | 6.931 | 1.642 |
| T2/G12 | 9.71 | 2.49 | 12.67 | 4.38 | 7.22 | 1.10 | 2.19 | 2.30 | 6.97 | 7.694 | 2.304 |
| V1-V5 | 0.00 | 0.00 | 0.00 | 0.00 | 33.28 | 0.00 | 0.00 | 0.00 | 33.28 | 0 | 0 |
| BFL/T1 | 3.15 | 1.53 | 3.81 | 1.13 | 4.43 | 6.44 | 3.83 | 3.35 | 4.72 | 2.314 | 2.925 |
| EFL/T2 | 4.30 | 6.66 | 5.47 | 6.17 | 4.50 | 5.10 | 4.47 | 4.26 | 4.70 | 4.706 | 5.118 |
| T4/G12 | 6.29 | 1.66 | 7.67 | 4.50 | 4.85 | 0.94 | 3.02 | 1.50 | 4.76 | 5.986 | 1.517 |
| AAG/T1 | 2.06 | 1.54 | 3.79 | 0.65 | 2.95 | 3.99 | 4.11 | 1.62 | 3.44 | 1.178 | 2.713 |
| ALT/G12 | 37.10 | 11.98 | 51.79 | 27.12 | 27.67 | 4.40 | 10.00 | 9.05 | 26.24 | 36.556 | 11.917 |
| T1/T5 | 1.01 | 2.51 | 0.66 | 3.58 | 0.94 | 1.00 | 0.71 | 0.68 | 0.89 | 0.946 | 0.850 |
| T6/T4 | 0.90 | 1.27 | 1.43 | 0.89 | 1.23 | 0.79 | 0.44 | 0.64 | 1.21 | 0.926 | 2.258 |
| BFL/(G23+G34+G45+G56) | 1.70 | 1.23 | 1.05 | 2.11 | 1.69 | 3.00 | 1.22 | 3.72 | 1.53 | 2.256 | 1.465 |

FIG. 50

MOBILE DEVICE AND OPTICAL IMAGING LENS THEREOF

INCORPORATION BY REFERENCE

This application claims priority from P.R.C. Patent Application No. 201410571552.8, filed on Oct. 23, 2014, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels are required.

U.S. Pat. Nos. 7,663,814 and 8,040,618 disclosed optical imaging lens constructed with an optical imaging lens having six lens elements. However, the length of the optical imaging lens, which, from the object-side surface of the first lens element to the image plane, is over 21 mm that is too long for smaller sized mobile devices.

Therefore, there is needed to develop optical imaging lens which is capable to place with six lens elements therein, with a shorter length, while also having good optical characteristics.

SUMMARY

An object of the present invention is to provide a camera device and an optical imaging lens thereof. With controlling the convex or concave shape of the surfaces and designing parameters satisfying at least one inequality, the length of the optical imaging lens is shortened and meanwhile the good optical characteristics, and system functionality are sustained.

In an exemplary embodiment, an optical imaging lens comprises, sequentially from an object side to an image side along an optical axis, a first lens element, an aperture stop, a second lens element, a third lens element, a fourth lens element, a fifth lens element and a sixth lens element, each of the first, second, third, fourth, fifth and sixth lens elements having refractive power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, an air gap between the fifth lens element and the sixth lens element along the optical axis, represented by G56, the central thickness of the sixth lens element, represented by T6, a distance between the image-side surface of the sixth lens element and the object-side surface of a filtering unit along the optical axis, represented by G6F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, the refractive index of the sixth lens element, represented by n6, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL, the length between the object-side surface of the first lens element and the image plane along the optical axis, represented by TTL, a sum of the central thicknesses of all six lens elements, comprising T1, T2, T3 T4, T5 and T6, represented by ALT, a sum of all five air gaps from the first lens element to the sixth lens element along the optical axis, represented by AAG (that is G12+G23+G34+G45+G56), and a back focal length of the optical imaging lens, which is defined as the distance from the image-side surface of the sixth lens element to the image plane along the optical axis comprising G6F, TF and GFP and represented by BFL.

In an exemplary embodiment, the image-side surface of the first lens element comprises a concave portion in a vicinity of the optical axis; the image-side surface of the second lens element comprises a convex portion in a vicinity of the optical axis; the object-side surface of the third lens element comprises a concave portion in a vicinity of a periphery of the third lens element; the object-side surface of the fourth lens element comprises a concave portion in a vicinity of the optical axis; the image-side surface of the fifth lens element comprises a concave portion in a vicinity of the optical axis; the image-side surface of the sixth lens element comprises a concave portion in a vicinity of the optical axis;

and the optical imaging lens comprises no other lenses having refracting power beyond the six lens elements, In this present invention, the parameters described above could be controlled to satisfy some equations as follows:

$$EFL/G12 \leq 86 \quad \text{Equation(1); or}$$

$$ALT/T1 \leq 9.3 \quad \text{Equation(2); or}$$

$$EFL/T4 \leq 11.7 \quad \text{Equation(3); or}$$

$$T1/G12 \leq 7 \quad \text{Equation(4); or}$$

$$T3/G12 \leq 7 \quad \text{Equation(5); or}$$

$$T2/T1 \leq 1.66 \quad \text{Equation(6); or}$$

$$EFL/T1 \leq 13 \quad \text{Equation(7); or}$$

$$T5/G12 \leq 7.4 \quad \text{Equation(8); or}$$

$$T2/G12 \leq 7.7 \quad \text{Equation(9); or}$$

$$|v1-v5| \leq 10 \quad \text{Equation(10); or}$$

$$BFL/T1 \leq 4 \quad \text{Equation(11); or}$$

$$EFL/T2 \leq 8.2 \quad \text{Equation(12); or}$$

$$T4/G12 \leq 6.5 \quad \text{Equation(13); or}$$

$$AAG/T1 \leq 3 \quad \text{Equation(14); or}$$

$$ALT/G12 \leq 60 \quad \text{Equation(15); or}$$

$$0.85 \leq T1/T5 \quad \text{Equation(16); or}$$

$$T6/T4 \leq 2.6 \quad \text{Equation(17); or}$$

$$1.65 \leq BFL/(G23+G34+G45+G56) \quad \text{Equation(18).}$$

Aforesaid exemplary embodiments are not limited and could be selectively incorporated in other embodiments described herein.

In some exemplary embodiments, more details about the convex or concave surface structure, refractive power could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the camera device and the optical imaging lens thereof in exemplary embodiments achieve good optical characters and effectively reduce the length of the optical imaging lens.

BRIEF DESCRIPTION OF THE DRAWINGS

Exemplary embodiments will be more readily understood from the following detailed description when read in conjunction with the appended drawing, in which:

FIG. 3 is a schematic view of a first example of the surface shape and the efficient radius of the lens element;

FIG. 4 is a schematic view of a second example of the surface shape and the efficient radius of the lens element;

FIG. 5 is a schematic view of a third example of the surface shape and the efficient radius of the lens element;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of the optical imaging lens of a seventh embodiment of the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 40 is a table of optical data for each lens element of the optical imaging lens of an ninth embodiment of the present disclosure;

FIG. 41 is a table of aspherical data of an ninth embodiment of the optical imaging lens according to the present disclosure;

FIG. 44 is a table of optical data for each lens element of the optical imaging lens of a tenth embodiment of the present disclosure;

FIG. 45 is a table of aspherical data of a tenth embodiment of the optical imaging lens according to the present disclosure;

FIG. 48 is a table of optical data for each lens element of the optical imaging lens of a eleventh embodiment of the present disclosure;

FIG. 49 is a table of aspherical data of a eleventh embodiment of the optical imaging lens according to the present disclosure;

FIG. 50 is a table for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of all eleven example embodiments;

DETAILED DESCRIPTION

Figures 1, 2:
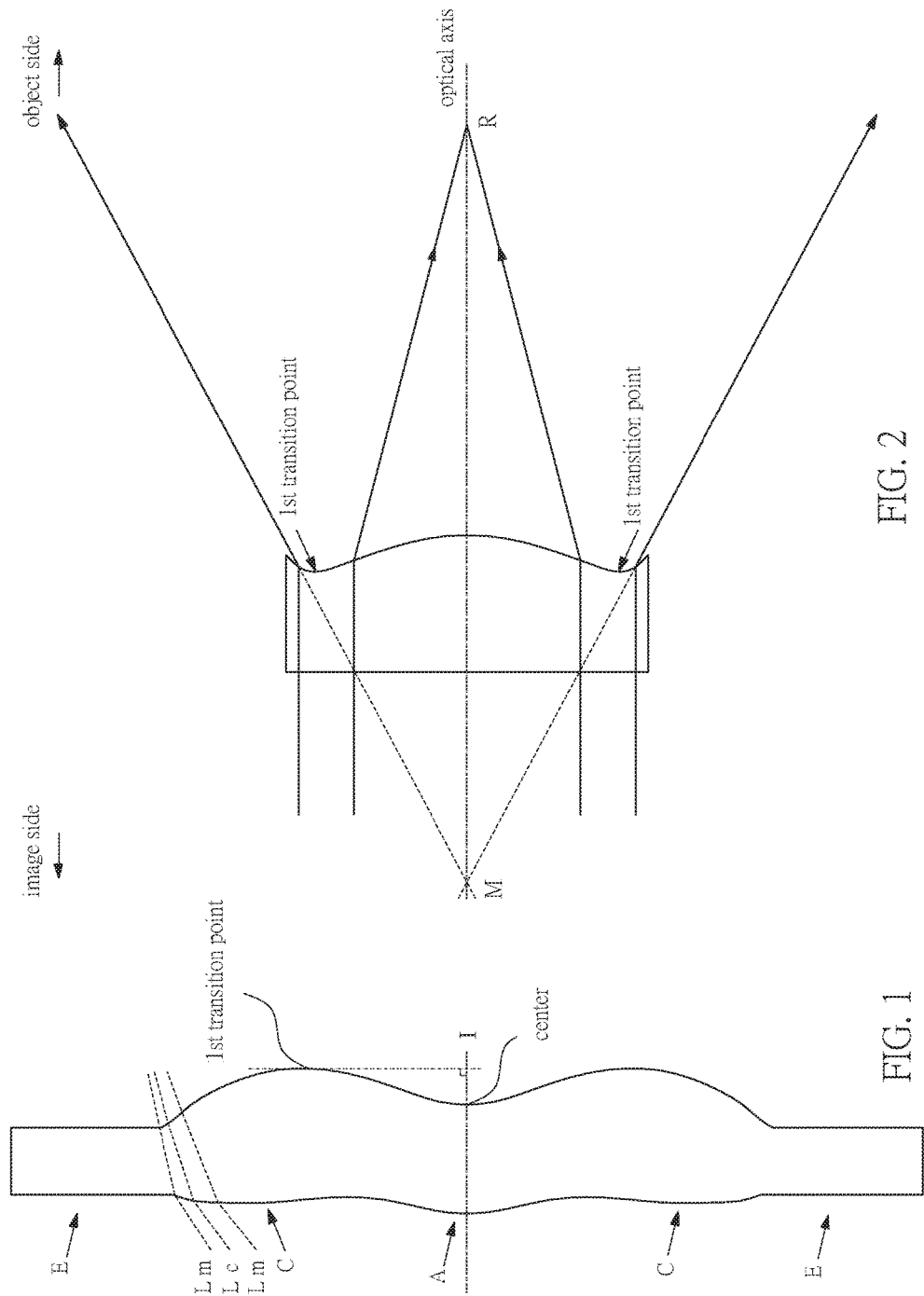
FIG. 1 is a cross-sectional view of one single lens element according to the present disclosure.
FIG. 2 is a schematic view of the relation between the surface shape and the optical focus of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

In the present invention, examples of an optical imaging lens which is a prime lens are provided. Example embodiments of an optical imaging lens may comprise a first lens element, an aperture stop, a second lens element, a third lens element, a fourth lens element, a fifth lens element and a sixth lens element, each of the lens elements comprises refractive power, an object-side surface facing toward an object side and an image-side surface facing toward an image side. These lens elements may be arranged sequentially from the object side to the image side along an optical axis, and example embodiments of the lens as a whole may comprise only the six lens elements having refractive power. Through controlling the convex or concave shape of the surfaces and/or the refraction power of the lens element(s), the camera device and the optical imaging lens thereof in exemplary embodiments achieve good optical characters and effectively shorten the length of the optical imaging lens.

In an example embodiment: the image-side surface of the first lens element comprises a concave portion in a vicinity of the optical axis; the image-side surface of the second lens element comprises a convex portion in a vicinity of the optical axis; the object-side surface of the third lens element comprises a concave portion in a vicinity of a periphery of the third lens element; the object-side surface of the fourth lens element comprises a concave portion in a vicinity of the optical axis; the image-side surface of the fifth lens element comprises a concave portion in a vicinity of the optical axis; the image-side surface of the sixth lens element comprises a concave portion in a vicinity of the optical axis; and the sixth lens element made of plastic. Wherein the optical imaging lens only comprises those six lens elements having refractive power.

In an example embodiment: the image-side surface of the first lens element comprises a concave portion in a vicinity of the optical axis; the image-side surface of the second lens element comprises a convex portion in a vicinity of the optical axis; the object-side surface of the third lens element comprises a concave portion in a vicinity of a periphery of the third lens element; the object-side surface of the fourth lens element comprises a concave portion in a vicinity of the optical axis; the image-side surface of the fifth lens element comprises a concave portion in a vicinity of the optical axis; the image-side surface of the sixth lens element comprises a concave portion in a vicinity of the optical axis; the arrangements of these lens elements can enhance the imaging quality.

Besides, the aperture stop located between the first lens element and the second lens element can increase the field angles and adjust the aberration. The sixth lens element made of plastic can reduce the overall weight of the optical imaging lens and the manufacturing cost of the optical imaging lens.

Further, when the object-side surface of the first lens element is formed with a convex portion in a vicinity of the optical axis, the image-side surface of the first lens element comprises a concave portion in a vicinity of a periphery of the first lens element axis; the object-side surface of the second lens element is formed with a convex portion in a vicinity of the optical axis, the image-side surface of the second lens element comprises a convex portion in a vicinity of a periphery of the second lens element, the object-side surface of the third lens element is formed with a concave portion in a vicinity of the optical axis, the image-side surface of the third lens element is formed with a convex portion in a vicinity of the optical axis, and a convex portion in a vicinity of a periphery of the third lens element; the image-side surface of the fourth lens element is formed with a convex portion in a vicinity of the optical axis, the object-side surface of the fifth lens element is formed with a convex portion in a vicinity of the optical axis, and a concave portion in a vicinity of a periphery of the fifth lens element, the image-side surface of the fifth lens element is formed with a convex portion in a vicinity of a periphery of the fifth lens element, and/or the object-side surface of the sixth lens element is formed with a convex portion in a vicinity of the optical axis. The imaging quality is improved as the length of the optical imaging lens is shortened. When all lens elements are made by plastic material, the benefit of reduced production difficulty, cost and weight is enhanced.

Since the requirement of the image quality is higher and higher, and the length of the optical imaging lens is becoming shorter and shorter, the shapes in a vicinity of the optical axis and a periphery of a lens element are varied in light of the light path to meet the requirements of imaging quality and demanded length of the optical imaging lens. Therefore, the thicknesses in a vicinity of the optical axis and a periphery of a lens element are different, and this makes the light incident in a lens element the more far from the optical axis requires for a refraction angle with the more degrees to focus on the imaging plane. According to one embodiment of the present invention, the object-side surface of the first lens element is formed with a convex portion in a vicinity of the optical axis, therefore, the ratios of ALT/T1, T2/T1, BFL/T1, EFL/T1, AAG/T1 and T1/T5 can be appropriately controlled to improve the performance of the optical imaging lens and shorten the total length of the optical imaging lens. For example, ALT, BFL, EFL, AAG, T1, T2 and T5 can be satisfied these equations: $ALT/T1 \leq 9.3$, $T2/T1 \leq 1.66$, $EFL/T1 \leq 13$, $BFL/T1 \leq 4$, $AAG/T1 \leq 3$ and $0.85 \leq T1/T5$.

ALT and AAG respectively are represented as a sum of the central thicknesses of all six lens elements, and a sum of all five air gaps from the first lens element to the sixth lens element along the optical axis, which are main factors in an optical imaging lens, the reduction of ALT or AAG will help to reduce the total length of the optical imaging lens. Also, the reduction of EFL may help to increase the field angle as well as reduction of BFL. Because the shortening of the thickness of lens element is limited by the present manufacturing skills, the reductions of T1, T2, T5 are limited. Further, the designed filed angle of the present invention is wilder, and the aperture stop located between the first lens element and the second lens element, therefore, G12 needs to be maintained in a certain value to let all of the light outbound from the first lens can go through the aperture stop then enter the second lens element. The ratios of EFL/G12, T1/G12, T3/G12, T5/G12, T2/G12, T4/G12 and ALT/G12 can be appropriately controlled to reduce the total thickness of the optical imaging lens and adjust the aberration. For example, EFL, ALT, T1, T2, T3, T4, T5 and G12 can be satisfied these equations: $EFL/G12 \leq 86$, $T1/G12 \leq 7$, $T3/G12 \leq 7$, $T5/G12 \leq 7.4$, $T2/G12 \leq 7.7$, $T4/G12 \leq 6.5$ and $ALT/G12 \leq 60$.

The reduction of EFL may help to increase the field angle, therefore, the ratios of EFL/T4 and EFL/T2 preferably are controlled in the ranges of $EFL/T4 \leq 11.7$ and $EFL/T2 \leq 8.2$. Also, The reduction of other air gap may help to reduce the total length of the optical imaging lens, as well as easier to manufacture, therefore, the ratios of BFL and G23+G34+G45+G56 preferably is controlled in the range of $1.65 \leq BFL/(G23+G34+G45+G56)$. Further, the reduction of the thickness of the sixth lens element may help to reduce the total length of the optical imaging lens, therefore, the ratio of T6 and T4 preferably is controlled in the range of T6/T4≤2.6. The values of the abbe numbers v1 and v5 can be appropriately controlled to adjust the chromatic aberration. For example, |v1−v5|≤10. Other than controlling the parameters in the ranges defined in the equations (1)~(18), better image quality may be obtained by further controlling hose parameters in the ranges of: EFL/G12 in the range of 2~86; ALT/T1 in the range of 2.5~9.3; EFL/T4 in the range of 2.5~11.7; T1/G12 in the range of 0.1~7; T3/G12 in the range of 0.1~7; T2/T1 in the range of 0.1~1.66; EFL/T1 in the range of 2~13; T5/G12 in the range of 0.1~7.4; T2/G12 in the range of 0.8~7.7; |v1−v5| in the range of 0~10; BFL/T1 in the range of 0.1~4; EFL/T2 in the range of 3.5~8.2; T4/G12 in the range of 0.5~6.5; AAG/T1 in the range of 0.1~3; ALT/G12 in the range of 3~60; T1/T5 in the range of 0.85~4.5; T6/T4 in the range of 0.1~2.6; and BFL/(G23+G34+G45+G56) in the range of 1.65~4.5.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
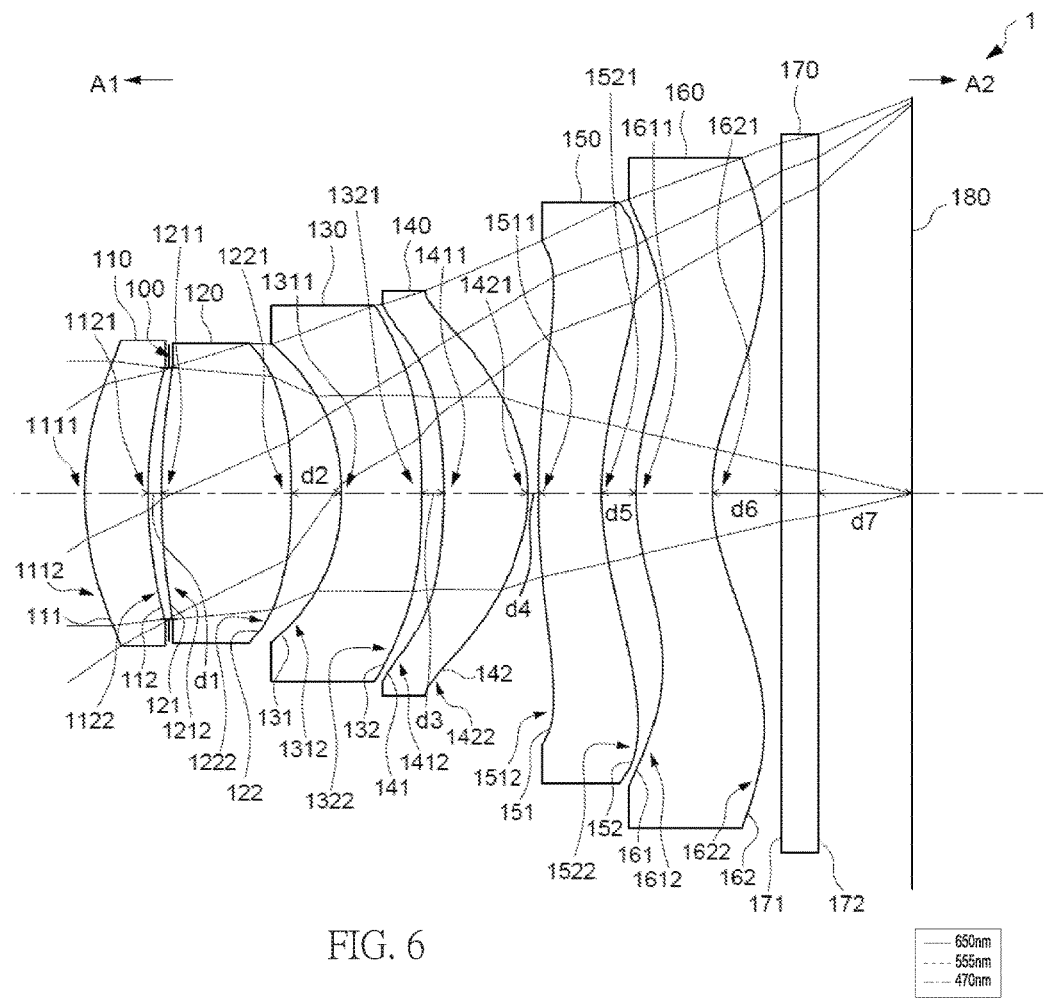
FIG. 6 is a cross-sectional view of a first embodiment of an optical imaging lens having six lens elements according to the present disclosure.
Figure 7:
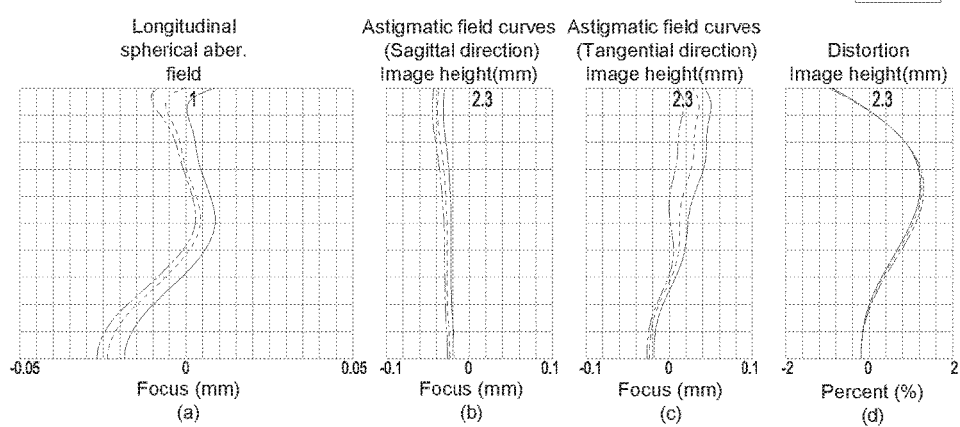
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a broadened shot angle. Reference is now made to FIGS. 6-9. FIG. 6 illustrates an example cross-sectional view of an optical imaging lens having six lens elements of the optical imaging lens according to a first example embodiment. FIG. 7 shows example charts of longitudinal spherical aberration and other kinds of optical aberrations of the optical imaging lens according to an example embodiment. FIG. 8 illustrates an example table of optical data of each lens element of the optical imaging lens according to an example embodiment, in which a focal length of the optical imaging lens is labelled as "f". FIG. 9 depicts an example table of aspherical data of the optical imaging lens according to an example embodiment.

As shown in FIG. 6, the optical imaging lens 1 of the present embodiment comprises, in order from an object side A1 to an image side A2 along an optical axis, a first lens element 110, an aperture stop 100, a second lens element 120, a third lens element 130, a fourth lens element 140, a fifth lens element 150 and a sixth lens element 160. A filtering unit 170 and an image plane 180 of an image sensor are positioned at the image side A2 of the optical lens 1. In this embodiment, the filtering unit 170 is infrared cut filter and located between the sixth lens element 160 and an image plane 180. The filtering unit 170 selectively absorbs light with specific wavelength from the light passing optical imaging lens 1. For example, IR light is absorbed, and this will prohibit the IR light which is not seen by human eyes from producing an image on the image plane 180. Each of the first, second, third, fourth, fifth and sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. An image plane 170 of an image sensor is positioned at the image side A2 of the optical imaging lens 1.

Exemplary embodiments of the optical imaging lens 1, wherein the first, second, third, fourth, fifth and sixth lens elements 110, 120, 130, 140, 150, 160 which may be constructed by plastic material which can help reducing the weight of the image lens, will now be described with reference to the drawings.

An example embodiment of the first lens element 110 has positive refractive power, with an object-side surface 111 facing an object-side A1 and an image-side surface 112 facing an image-side A2. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of a periphery of the first lens element 110. The object-side surface 111 and the image-side surface 112 of the first lens element 110 are both aspherical surface.

An example embodiment of the second lens element 120 has positive refractive power, with an object-side surface 121 facing an object-side A1 and an image-side surface 122 facing an image-side A2. The object-side surface 121 is a convex surface comprising a convex portion 1211 in a vicinity of the optical axis and a convex portion 1212 in a vicinity of a periphery of the second lens element 120. The image-side surface 122 is a convex surface comprising a convex portion 1221 in a vicinity of the optical axis and a convex portion 1222 in a vicinity of the periphery of the second lens element 120. The object-side surface 121 and the image-side surface 122 of the second lens element 120 are both aspherical surface.

An example embodiment of the third lens element 130 has negative refractive power, with an object-side surface 131 facing an object-side A1 and an image-side surface 132 facing an image-side A2. The object-side surface 131 is a concave surface comprises a concave portion 1311 in a vicinity of the optical axis and a concave portion 1312 in a vicinity of a periphery of the third lens element 130. The image-side surface 132 is a convex surface comprising a convex portion 1321 in a vicinity of the optical axis and a convex portion 1322 in a vicinity of the periphery of the third lens element 130. The object-side surface 131 and the image-side surface 132 of the third lens element 130 are both aspherical surface.

An example embodiment of the fourth lens element 140 has positive refractive power, with an object-side surface 141 facing an object-side A1 and an image-side surface 142 facing an image-side A2. The object-side surface 141 is a concave surface comprising a concave portion 1411 in a vicinity of the optical axis and a concave portion 1412 in a vicinity of a periphery of the fourth lens element 140. The image-side surface 142 is a convex surface comprising a convex portion 1421 in a vicinity of the optical axis and a convex portion 1422 in a vicinity of the periphery of the fourth lens element 140. The object-side surface 141 and the image-side surface 142 of the fourth lens element 140 are both aspherical surface.

An example embodiment of the fifth lens element 150 has negative refractive power, with an object-side surface 151 facing an object-side A1 and an image-side surface 152 facing an image-side A2. The object-side surface 151 comprises a convex portion 1511 in a vicinity of the optical axis and a concave portion 1512 in a vicinity of a periphery of the fifth lens element 150. The image-side surface 152 comprises a concave portion 1521 in a vicinity of the optical axis and a convex portion 1522 in a vicinity of the periphery of the fifth lens element 150. The object-side surface 151 and the image-side surface 152 of the fifth lens element 150 are both aspherical surface.

An example embodiment of the sixth lens element 160 has negative refractive power, with an object-side surface 161 facing an object-side A1 and an image-side surface 162 facing an image-side A2. The object-side surface 161 comprises a convex portion 1611 in a vicinity of the optical axis and a concave portion 1612 in a vicinity of a periphery of the sixth lens element 160. The image-side surface 162 comprises a concave portion 1621 in a vicinity of the optical axis and a convex portion 1622 in a vicinity of the periphery of the sixth lens element 160. The object-side surface 161 and the image-side surface 162 of the sixth lens element 160 are both aspherical surface.

In example embodiments, air gaps exist between the lens elements 110, 120, 130, 140, 150, 160, the filtering unit 170 and the image plane 180 of the image sensor. For example, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, the air gap d7 existing between filtering unit 170 and the image plane 180 of the image sensor. However, in other embodiments, any of the aforesaid air gaps may not exist. The air gap d1 is denoted by G12, the air gap d2 is denoted by G23, the air gap d3 is denoted by G34, the air gap d4 is denoted by G45, the air gap d5 is denoted by G56, and the sum of d1, d2, d3, d4 and d5 is denoted by AAG.

FIG. 8 depicts the optical characteristics of each lens elements in the optical imaging lens 1 of the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 1 which shows that the distance from the object-side surface 111 of the first lens element 110 to the image plane 180 along the optical axis is 4.761 mm with an image height of 2.3 mm is shortened, compared with that of the conventional optical imaging lens.

The object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, are all aspherical surfaces defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

As illustrated in FIG. 7, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.03 mm. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 7, astigmatism aberration in the sagittal direction (b) and astigmatism aberration in the tangential direction (c). The horizontal axis defined as focal length and the vertical axis defined as image height, wherein the image height is 2.3 mm as shown therein. The focus variation with respect to the three wavelengths (470 nm, 555 nm, 650 nm) in the whole field falls within ±0.05 mm. This reflects the optical imaging lens 1 of the present embodiment eliminates aberration effectively. Additionally, the closed curves represents dispersion is improved.

Please refer to FIG. 7, distortion aberration (d), which showing the distortion aberration of the optical imaging lens 1 is within ±1.2%. The horizontal axis defined as percentage and the vertical axis defined as image height, wherein the image height is 2.3 mm as shown therein.

Therefore, from FIGS. 7(a)~7(d), the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 10:
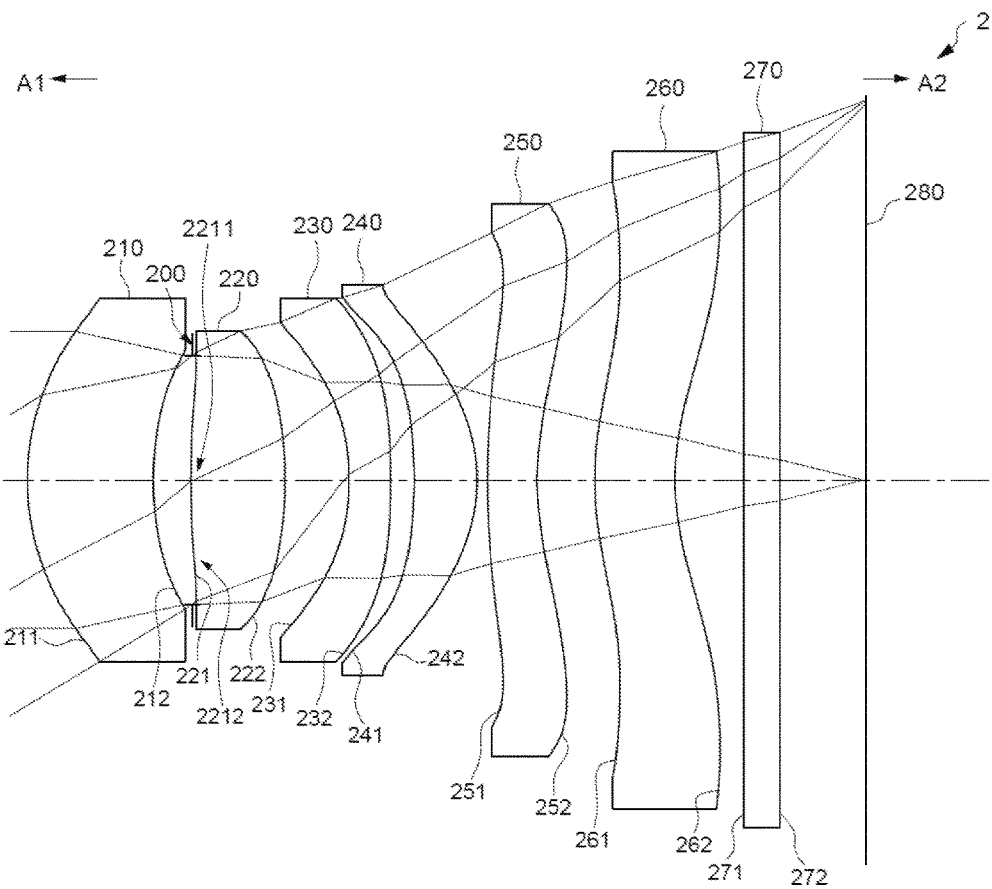
FIG. 10 is a cross-sectional view of a second embodiment of an optical imaging lens having six lens elements according to the present disclosure.
Figure 11:
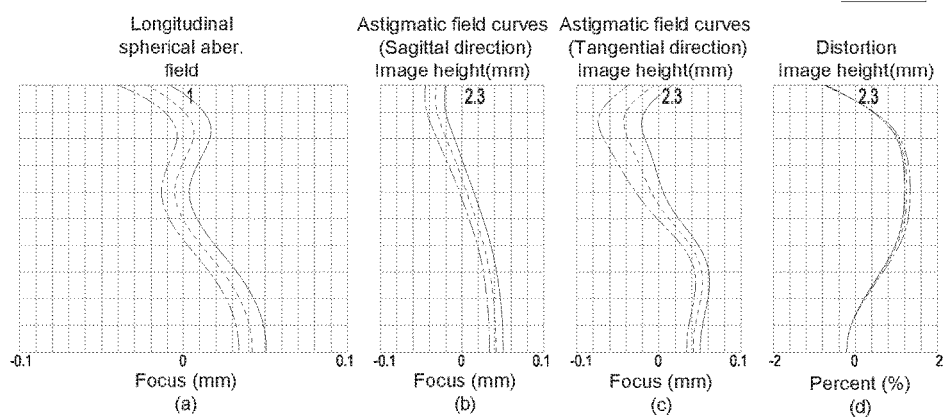
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having six lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, comprises a first lens element 210, an aperture stop 200, a second lens element 220, a third lens element 230, a fourth lens element 240, a fifth lens element 250 and a sixth lens element 260.

The differences between the second embodiment and the first embodiment are the radius of curvature and thickness of each lens element, the distance of each air gap, back focal length and the configuration of the concave/convex shape of the object-side surface 221, but the configuration of the positive/negative refractive power of the first, second, third, fourth, fifth and sixth lens elements 210, 220, 230, 240, 250, 260 and configuration of the concave/convex shape of surfaces, comprising the object-side surfaces 211, 231, 241, 251, 261 facing to the object side A1 and the image-side surfaces 212, 222, 232, 242, 252, 262 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 221 of the second lens element 220 comprises a convex portion 2211 in a vicinity of the optical axis and a concave portion 2212 in a vicinity of a periphery of the second lens element 220. Please refer to FIG. 12 for the optical characteristics and their air gaps of each lens elements in the optical imaging lens 2 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 2 which shows that the distance from the object-side surface 211 of the first lens element 210 to the image plane 280 along the optical axis is 4.869 mm and the length of the optical imaging lens 2 is shortened, compared with that of the conventional optical imaging lens and even with the optical imaging lens 1 of the first embodiment.

As shown in FIG. 11(a), the longitudinal spherical aberration curves of different wavelengths are all controlled within ±0.03 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 11(b), it shows the astigmatism aberration in the sagittal direction (b) and the focus variation with respect to the three wavelengths in the whole field falls within ±0.06 mm. Please refer to FIG. 11(c), it shows astigmatism aberration in the tangential direction (c) and the focus variation with respect to the three wavelengths in the whole field falls within ±0.08 mm. Additionally, the closed curves represents dispersion is improved.

Please refer to FIG. 11(d), distortion aberration, which showing the distortion aberration of the optical imaging lens 1 is within ±1.6%.

Therefore, from FIGS. 11(a)~11(d), the optical imaging lens 2 of the present embodiment shows great characteristics in the longitudinal spherical aberration, astigmatism in the sagittal direction, astigmatism in the tangential direction, and distortion aberration. According to above illustration, the optical imaging lens 2 of the example embodiment indeed achieves great optical performance and the length of the optical imaging lens 2 is effectively shortened.

Figure 14:
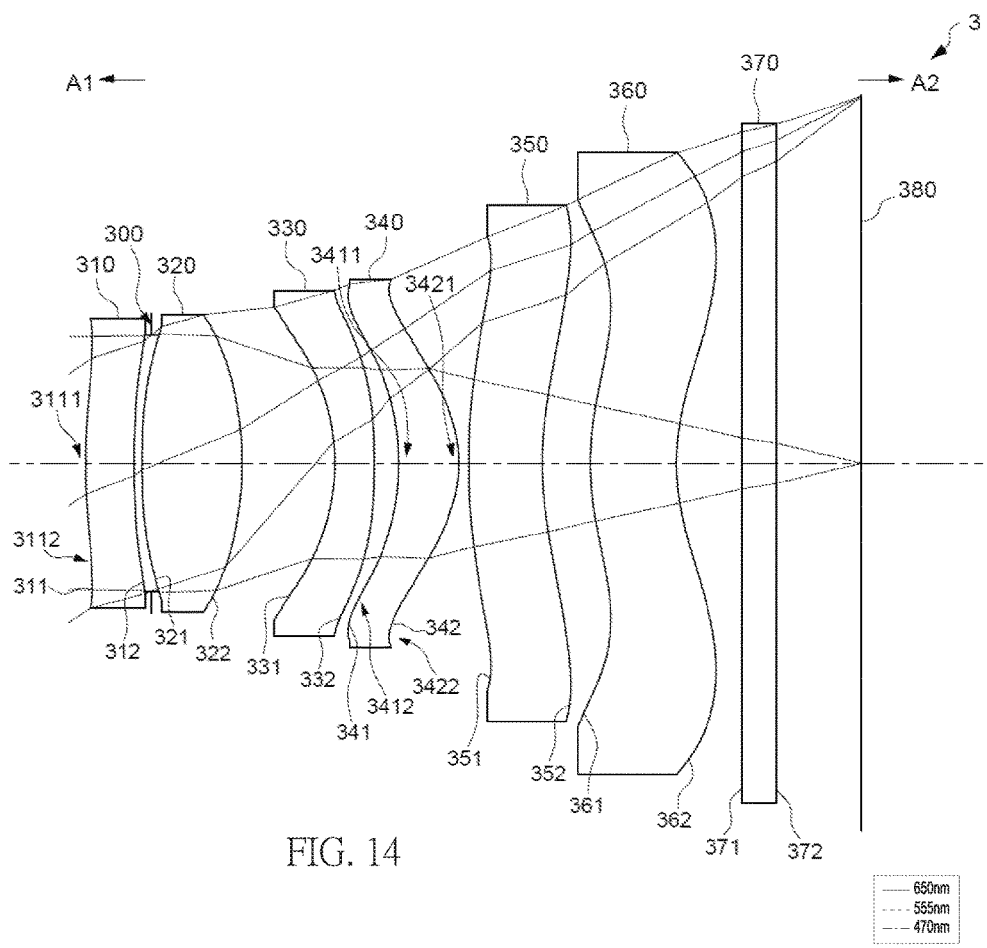
FIG. 14 is a cross-sectional view of a third embodiment of an optical imaging lens having six lens elements according to the present disclosure.
Figure 15:
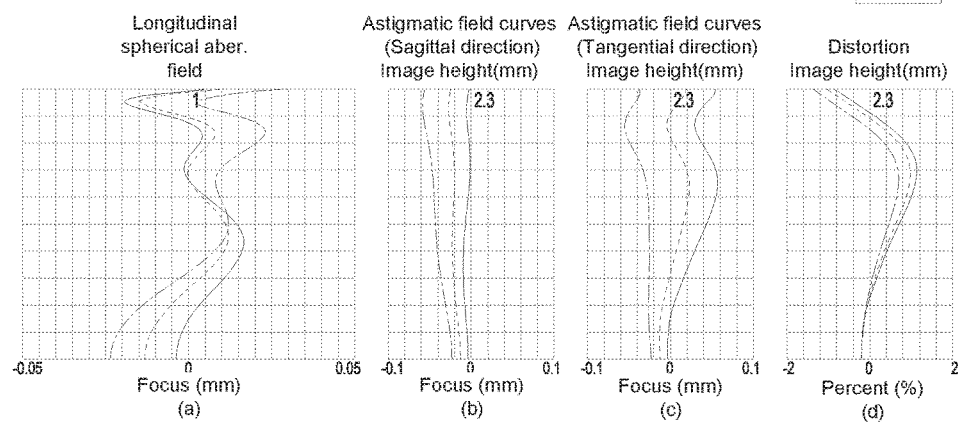
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, comprises a first lens element 310, an aperture stop 300, a second lens element 320, a third lens element 330, a fourth lens element 340, a fifth lens element 350 and a sixth lens element 360.

The differences between the third embodiment and the first embodiment are the radius of curvature and thickness of each lens element, the distance of each air gap, back focal length, configuration of the concave/convex shape of the object-side surfaces 311, 341 and the image-side surface 342, but the configuration of the positive/negative refractive power of the first, second, third, fourth, fifth and sixth lens elements 310, 320, 330, 340, 350, 360 and configuration of the concave/convex shape of surfaces, comprising the object-side surfaces 321, 331, 351, 361 facing to the object side A1 and the image-side surfaces 312, 322, 332, 352, 362 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 311 of the first lens element 310 comprises a convex portion 3111 in a vicinity of the optical axis and a concave portion 3112 in a vicinity of a periphery of the first lens element 310, the object-side surface 341 of the fourth lens element 340 comprises a concave portion 3411 in a vicinity of the optical axis and a convex portion 3412 in a vicinity of a periphery of the fourth lens element 340, the image-side surface 342 of the fourth lens element 340 comprises a convex portion 3421 in a vicinity of the optical axis and a concave portion 3422 in a vicinity of a periphery of the fourth lens element 340. Please refer to FIG. 16 for the optical characteristics and their air gaps of each lens elements in the optical imaging lens 3 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 3 which shows that the distance from the object-side surface 311 of the first lens element 310 to the image plane 380 along the optical axis is 4.735 mm and the length of the optical imaging lens 3 is shortened, compared with that of the conventional optical imaging lens and even with the optical imaging lens 1 of the first embodiment.

As shown in FIG. 15, the optical imaging lens 3 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.007 mm and even better than that of the first embodiment. Therefore, according to the above illustration, the optical imaging lens of the present embodiment indeed shows great optical performance and the length of the optical imaging lens 3 is effectively shortened.

As shown in FIG. 15(a), the longitudinal spherical aberration curves of different wavelengths are all controlled within ±0.025 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 15(b), it shows the astigmatism aberration in the sagittal direction (b) and the focus variation with respect to the three wavelengths in the whole field falls within ±0.06 mm. Please refer to FIG. 15(c), it shows astigmatism aberration in the tangential direction (c) and the focus variation with respect to the three wavelengths in the whole field falls within ±0.06 mm. Additionally, the closed curves represents dispersion is improved.

Please refer to FIG. 15(d), distortion aberration, which showing the distortion aberration of the optical imaging lens 1 is within ±1.6%.

Therefore, from FIGS. 15(a)~15(d), the optical imaging lens 3 of the present embodiment shows great characteristics in the longitudinal spherical aberration, astigmatism in the sagittal direction, astigmatism in the tangential direction, and distortion aberration. According to above illustration, the optical imaging lens 3 of the example embodiment indeed achieves great optical performance and the length of the optical imaging lens 3 is effectively shortened.

Figure 18:
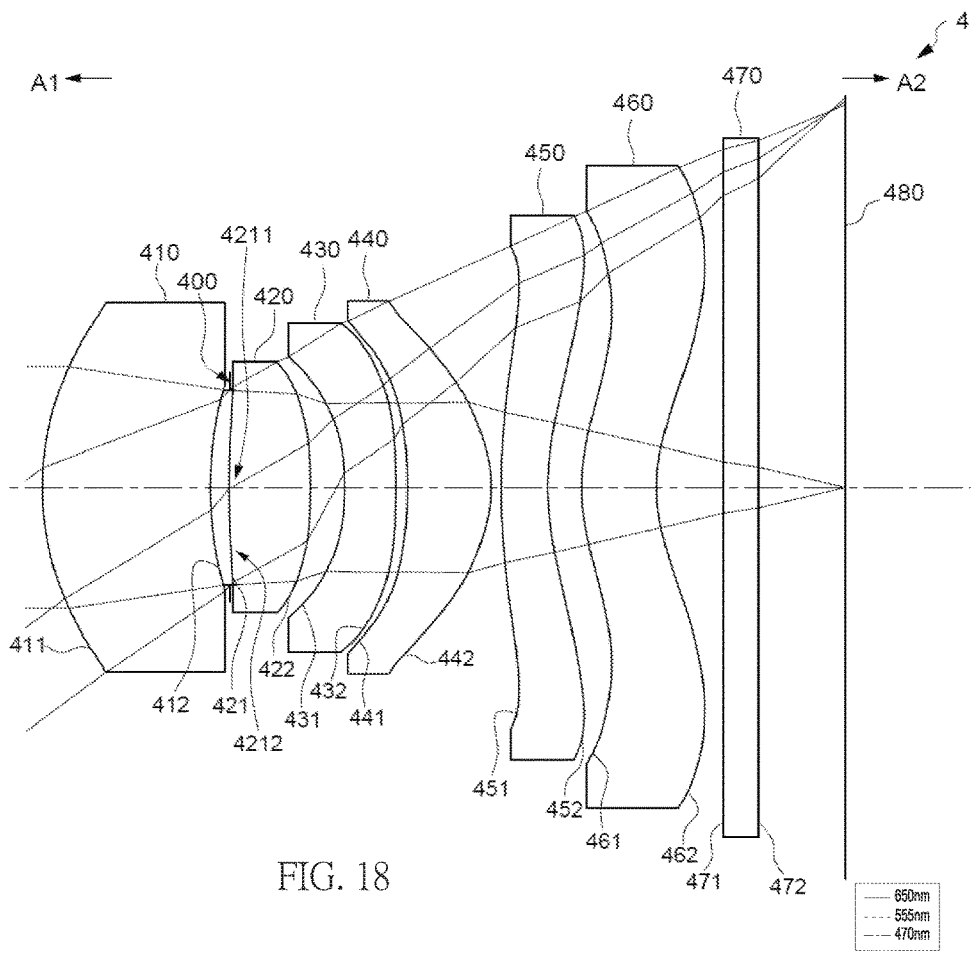
FIG. 18 is a cross-sectional view of a fourth embodiment of an optical imaging lens having six lens elements according to the present disclosure.
Figure 19:
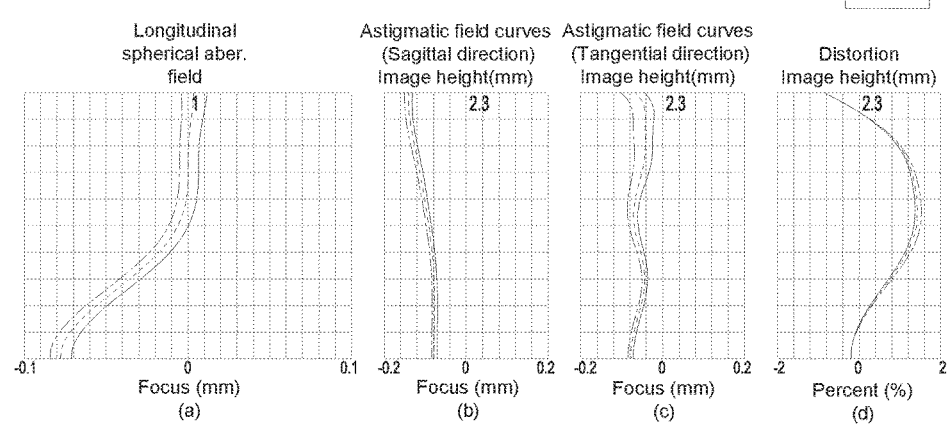
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, comprises a first lens element 410, an aperture stop 400, a second lens element 420, a third lens element 430, a fourth lens element 440, a fifth lens element 450 and a sixth lens element 460.

The differences between the fourth embodiment and the first embodiment are the radius of curvature and thickness of each lens element, the distance of each air gap, back focal length, configuration of the concave/convex shape of the object-side surface 421, but the configuration of the positive/negative refractive power of the first, second, third, fourth, fifth and sixth lens elements 410, 420, 430, 440, 450, 460 and configuration of the concave/convex shape of surfaces, comprising the object-side surfaces 411, 431, 441, 451, 461 facing to the object side A1 and the image-side surfaces 412, 422, 432, 442, 452, 462 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 421 of the second lens element 420 comprises a convex portion 4211 in a vicinity of the optical axis and a concave portion 4212 in a vicinity of a periphery of the second lens element 420. Please refer to FIG. 20 for the optical characteristics and their air gaps of each lens elements in the optical imaging lens 4 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 4 which shows that the distance from the object-side surface 411 of the first lens element 410 to the image plane 480 along the optical axis is 4.783 mm and the length of the optical imaging lens 4 is shortened, compared with that of the conventional optical imaging lens and even with that of the optical imaging lens 1 of the first embodiment.

As shown in FIG. 19(a), the longitudinal spherical aberration curves of different wavelengths are all controlled within ±0.09 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 19(b), it shows the astigmatism aberration in the sagittal direction (b) and the focus variation with respect to the three wavelengths in the whole field falls within ±0.16 mm. Please refer to FIG. 19(c), it shows astigmatism aberration in the tangential direction (c) and the focus variation with respect to the three wavelengths in the whole field falls within ±0.12 mm. Additionally, the closed curves represents dispersion is improved.

Please refer to FIG. 19(d), distortion aberration, which showing the distortion aberration of the optical imaging lens 1 is within ±1.6%.

Therefore, from FIGS. 19(a)~19(d), the optical imaging lens 4 of the present embodiment shows great characteristics in the longitudinal spherical aberration, astigmatism in the sagittal direction, astigmatism in the tangential direction, and distortion aberration. According to above illustration, the optical imaging lens 4 of the example embodiment indeed achieves great optical performance and the length of the optical imaging lens 4 is effectively shortened.

Figure 22:
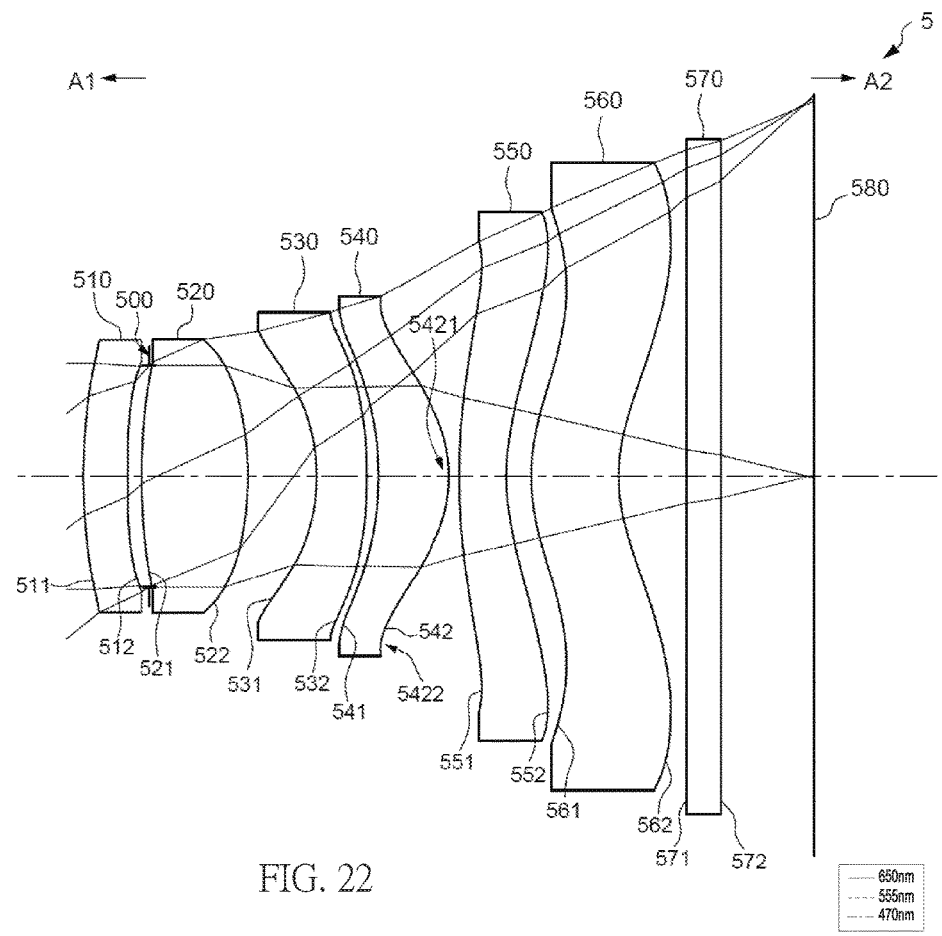
FIG. 22 is a cross-sectional view of a fifth embodiment of an optical imaging lens having six lens elements according to the present disclosure.
Figure 23:
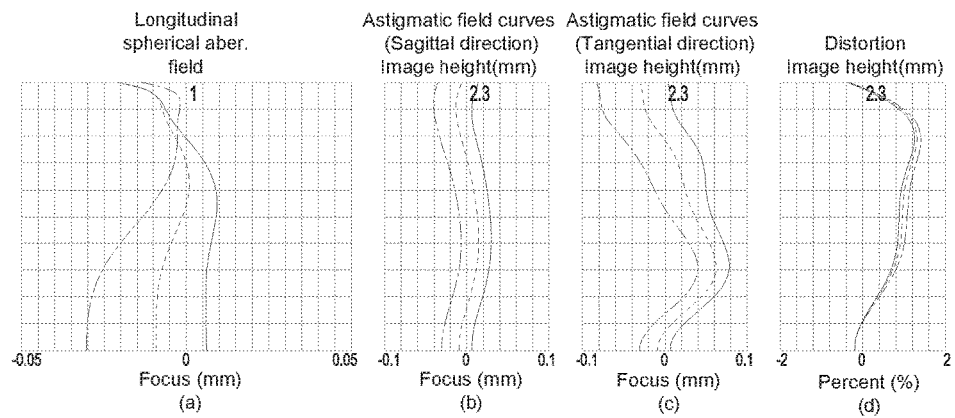
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, comprises a first lens element 510, an aperture stop 500, a second lens element 520, a third lens element 530, a fourth lens element 540, a fifth lens element 550 and a sixth lens element 560.

The differences between the fifth embodiment and the first embodiment are the radius of curvature and thickness of each lens element, the distance of each air gap, back focal length, the positive/negative refractive power of the sixth lens elements 560, configuration of the concave/convex shape of the image-side surface 542, but the configuration of the positive/negative refractive power of the first, second, third, fourth, and fifth lens elements 510, 520, 530, 540, 550 and configuration of the concave/convex shape of surfaces, comprising the object-side surfaces 511, 521, 531, 541, 551, 561 facing to the object side A1 and the image-side surfaces 512, 522, 532, 552, 562 facing to the image side A2, are similar to those in the first embodiment. Here, for clearly showing the drawings of the present embodiment, only the surface shapes which are different from that in the first embodiment are labeled. Specifically, the differences between the present and first embodiments are: the refractive power of the sixth lens elements 560 is positive, the image-side surface 542 of the fourth lens element 540 comprises a convex portion 5221 in a vicinity of the optical axis and a concave portion 5222 in a vicinity of a periphery of the fourth lens element 540. Please refer to FIG. 24 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 5 which shows that the distance from the object-side surface 511 of the first lens element 510 to the image plane 580 along the optical axis is 4.349 mm and the length of the optical imaging lens 5 is shortened, compared with that of the conventional optical imaging lens.

As shown in FIG. 23(a), the longitudinal spherical aberration curves of different wavelengths are all controlled within ±0.03 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 23(b), it shows the astigmatism aberration in the sagittal direction (b) and the focus variation with respect to the three wavelengths in the whole field falls within ±0.04 mm. Please refer to FIG. 23(c), it shows astigmatism aberration in the tangential direction (c) and the focus variation with respect to the three wavelengths in the whole field falls within ±0.1 mm. Additionally, the closed curves represents dispersion is improved.

Please refer to FIG. 23(d), distortion aberration, which showing the distortion aberration of the optical imaging lens 1 is within ±1.6%.

Therefore, from FIGS. 23(a)~23(d), the optical imaging lens 5 of the present embodiment shows great characteristics in the longitudinal spherical aberration, astigmatism in the sagittal direction, astigmatism in the tangential direction, and distortion aberration. According to above illustration, the optical imaging lens 5 of the example embodiment indeed achieves great optical performance and the length of the optical imaging lens 5 is effectively shortened.

Figure 26:
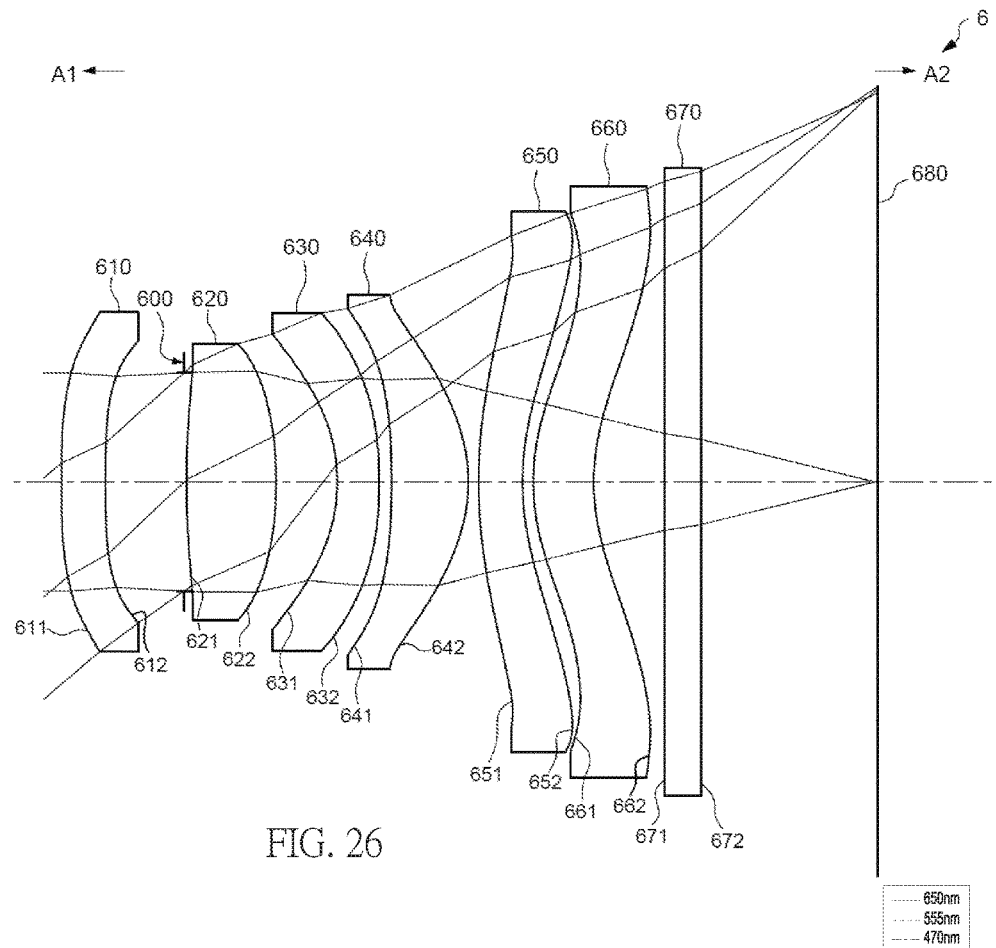
FIG. 26 is a cross-sectional view of a sixth embodiment of an optical imaging lens having six lens elements according to the present disclosure.
Figure 27:
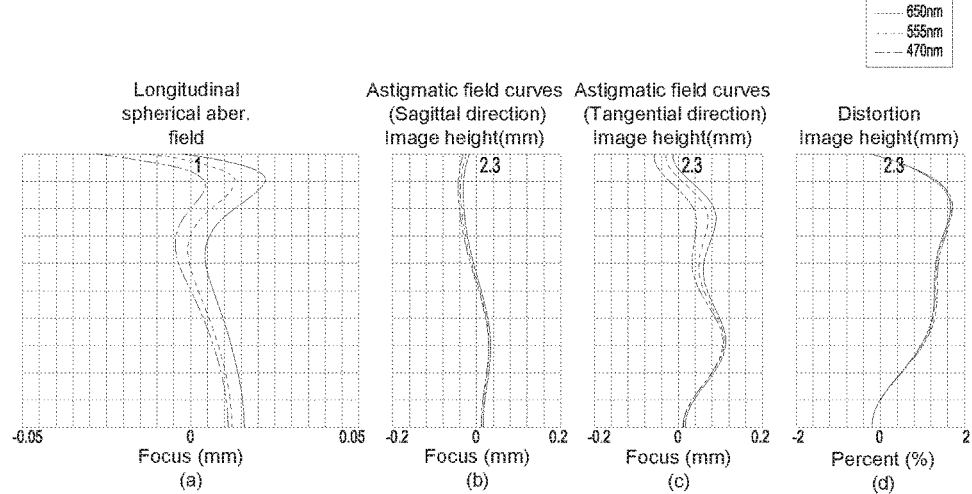
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having six lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, comprises a first lens element 610, an aperture stop 600, a second lens element 620, a third lens element 630, a fourth lens element 640, a fifth lens element 650 and a sixth lens element 660.

The differences between the sixth embodiment and the first embodiment are the radius of curvature and thickness of each lens element and the distance of each air gap, back focal length, and the refraction power of the sixth lens element 660, but the configuration of the positive/negative refractive power of the first, second, third, fourth, and fifth lens elements 610, 620, 630, 640, 650, and configuration of the concave/convex shape of surfaces, comprising the object-side surfaces 611, 621, 631, 641, 651, 661 facing to the object side A1 and the image-side surfaces 612, 622, 632, 642, 652, 662 facing to the image side A2, are similar to those in the first embodiment. Specifically, the differences between the present and first embodiments are: the refraction power of the sixth lens element 660 is positive. Please refer to FIG. 28 for the optical characteristics and their air gaps of each lens elements in the optical imaging lens 6 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 6 which shows that the distance from the object-side surface 611 of the first lens element 610 to the image plane 680 along the optical axis is 4.633 mm and the length of the optical imaging lens 6 is shortened compared with that of the conventional optical imaging lens.

As shown in FIG. 27(a), the longitudinal spherical aberration curves of different wavelengths are all controlled within ±0.03 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 27(b), it shows the astigmatism aberration in the sagittal direction (b) and the focus variation with respect to the three wavelengths in the whole field falls within ±0.05 mm. Please refer to FIG. 27(c), it shows astigmatism aberration in the tangential direction (c) and the focus variation with respect to the three wavelengths in the whole field falls within ±0.12 mm. Additionally, the closed curves represents dispersion is improved.

Please refer to FIG. 27(d), distortion aberration, which showing the distortion aberration of the optical imaging lens 1 is within ±2%.

Therefore, from FIGS. 27(a)~27(d), the optical imaging lens 6 of the present embodiment shows great characteristics in the longitudinal spherical aberration, astigmatism in the sagittal direction, astigmatism in the tangential direction, and distortion aberration. According to above illustration, the optical imaging lens 6 of the example embodiment indeed achieves great optical performance and the length of the optical imaging lens 6 is effectively shortened.

Figure 30:
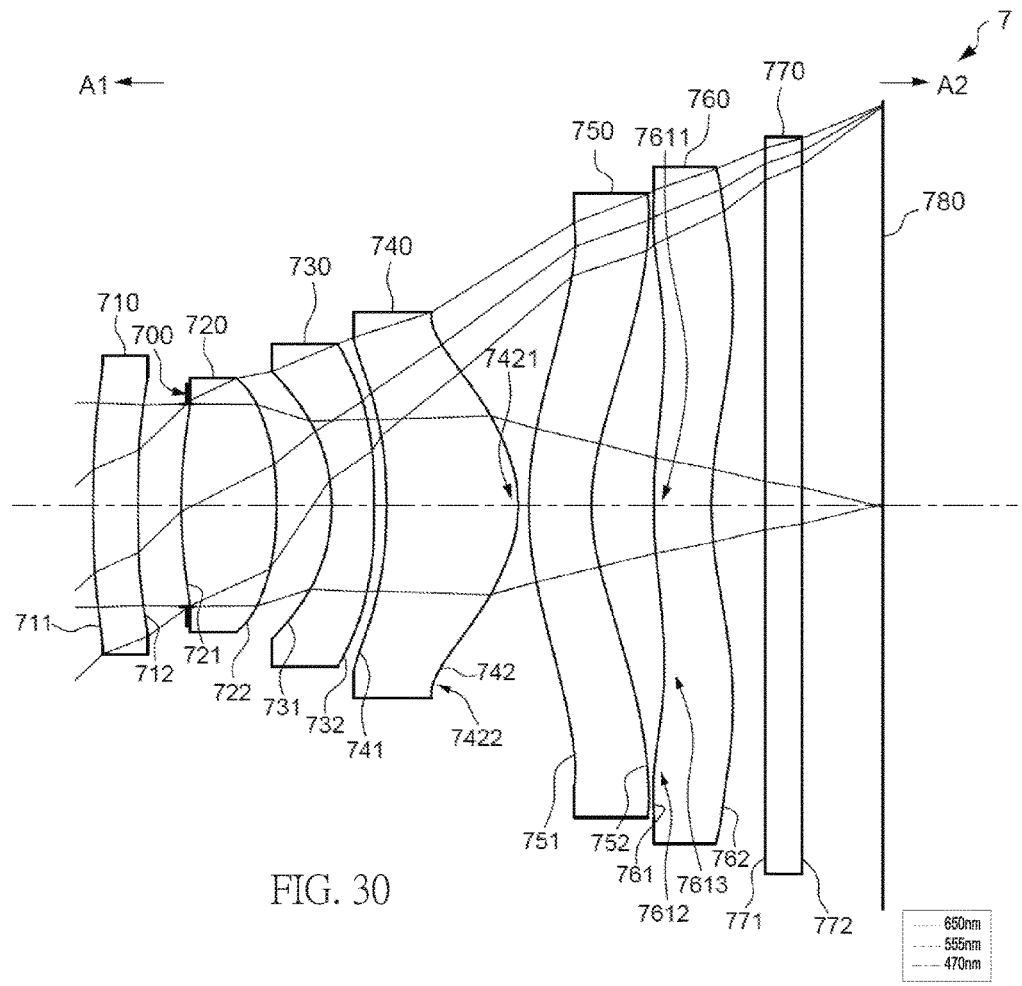
FIG. 30 is a cross-sectional view of a seventh embodiment of an optical imaging lens having six lens elements according to the present disclosure.
Figure 31:
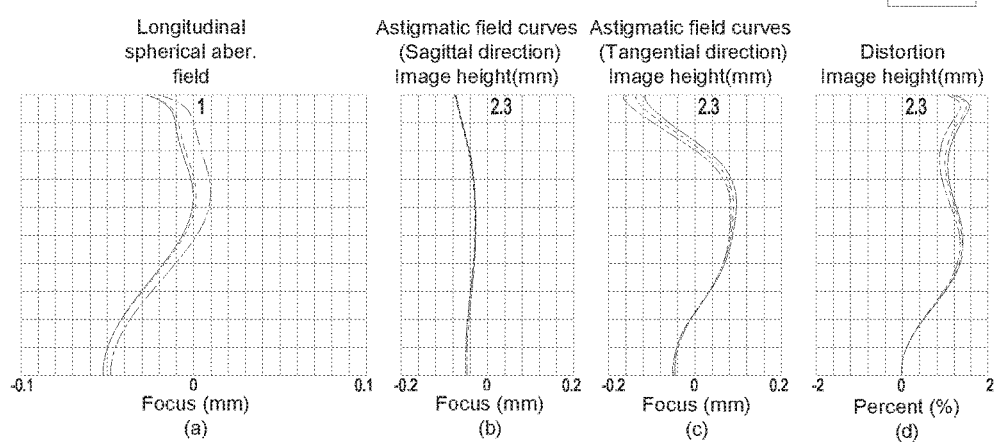
FIG. 31 is a chart of longitudinal spherical aberration and other kinds of optical aberrations of a seventh embodiment of the optical imaging lens according the present disclosure.

Reference is now made to FIGS. 30-33. FIG. 30 illustrates an example cross-sectional view of an optical imaging lens 7 having six lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, comprises a first lens element 710, an aperture stop 700, a second lens element 720, a third lens element 730, a fourth lens element 740, a fifth lens element 750 and a sixth lens element 760.

The differences between the seventh embodiment and the first embodiment are the radius of curvature and thickness of each lens element, the distance of each air gap, back focal length, configuration of the concave/convex shape of the object-side surface 761, and the image-side surfaces 742, but the configuration of the positive/negative refractive power of the first, second, third, fourth, fifth and sixth lens elements 710, 720, 730, 740, 750, 760 and configuration of the concave/convex shape of surfaces, comprising the object-side surfaces 711, 721, 731, 741, 751 facing to the object side A1 and the image-side surfaces 712, 722, 732, 752, 762 facing to the image side A2, are similar to those in the first embodiment. Here, for clearly showing the drawings of the present embodiment, only the surface shapes which are different from that in the first embodiment are labeled. Specifically, the differences between the present and first embodiments are: the image-side surface 742 of the fourth lens element 740 comprises a convex portion 7421 in a vicinity of the optical axis and a concave portion 7422 in a vicinity of a periphery of the fourth lens element 740, the object-side surface 761 of the sixth lens element 760 comprises a convex portion 7611 in a vicinity of the optical axis and a convex portion 7612 in a vicinity of a periphery of the sixth lens element 760, and a concave portion 7613 between the two convex portions 7611, 7612. Please refer to FIG. 32 for the optical characteristics and their air gaps of each lens elements in the optical imaging lens 7 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 7 which shows that the distance from the object-side surface 711 of the first lens element 710 to the image plane 780 along the optical axis is 4.433 mm and the length of the optical imaging lens 7 is shortened, compared with that of the conventional optical imaging lens.

As shown in FIG. 31(a), the longitudinal spherical aberration curves of different wavelengths are all controlled within ±0.06 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 31(b), it shows the astigmatism aberration in the sagittal direction (b) and the focus variation with respect to the three wavelengths in the whole field falls within ±0.08 mm. Please refer to FIG. 31(c), it shows astigmatism aberration in the tangential direction (c) and the focus variation with respect to the three wavelengths in the whole field falls within ±0.2 mm. Additionally, the closed curves represents dispersion is improved.

Please refer to FIG. 31(d), distortion aberration, which showing the distortion aberration of the optical imaging lens 1 is within ±1.6%.

Therefore, from FIGS. 31(a)~31(d), the optical imaging lens 7 of the present embodiment shows great characteristics in the longitudinal spherical aberration, astigmatism in the sagittal direction, astigmatism in the tangential direction, and distortion aberration. According to above illustration, the optical imaging lens 7 of the example embodiment indeed achieves great optical performance and the length of the optical imaging lens 7 is effectively shortened.

Figure 34:
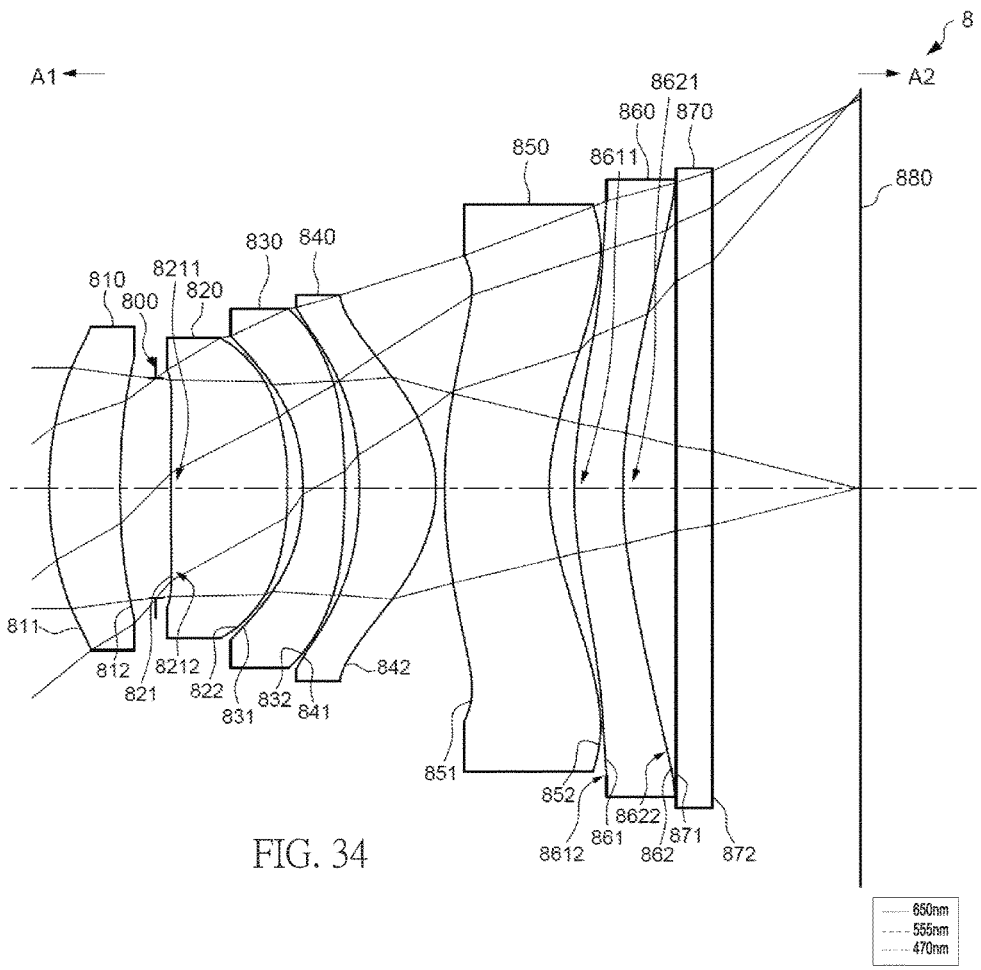
FIG. 34 is a cross-sectional view of an eighth embodiment of an optical imaging lens having six lens elements according to the present disclosure.
Figure 35:
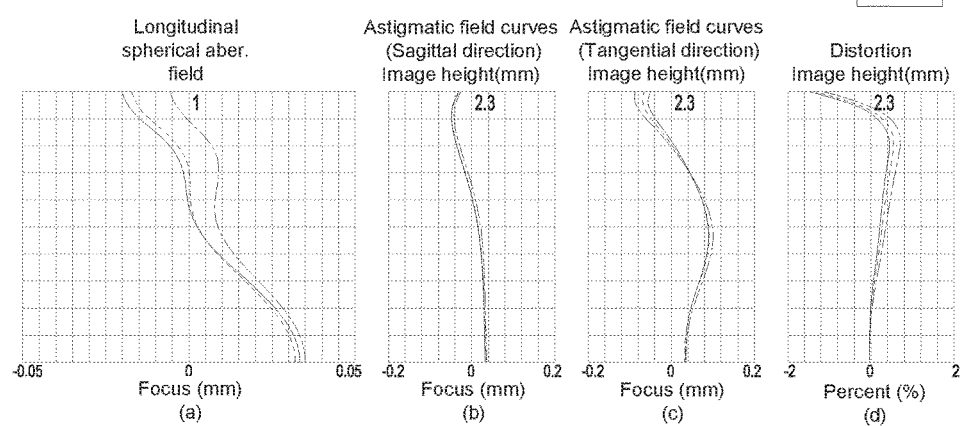
FIG. 35 is a chart of longitudinal spherical aberration and other kinds of optical aberrations of an eighth embodiment of the optical imaging lens according the present disclosure.

Reference is now made to FIGS. 34-37. FIG. 34 illustrates an example cross-sectional view of an optical imaging lens 8 having six lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, comprises a first lens element 810, an aperture stop 800, a second lens element 820, a third lens element 830, a fourth lens element 840, a fifth lens element 850 and a sixth lens element 860.

The differences between the eighth embodiment and the first embodiment are the radius of curvature and thickness of each lens element, the distance of each air gap, back focal length, configuration of the concave/convex shape of the object-side surfaces 821, 861 and the image-side surfaces 862, and the refractive power of the sixth lens elements 860, but the configuration of the positive/negative refractive power of the first, second, third, fourth and fifth lens elements 810, 820, 830, 840, 850 and configuration of the concave/convex shape of surfaces, comprising the object-side surfaces 811, 831, 841, 851 facing to the object side A1 and the image-side surfaces 812, 822, 832, 842, 852 facing to the image side A2, are similar to those in the first embodiment. Here, for clearly showing the drawings of the present embodiment, only the surface shapes which are different from that in the first embodiment are labeled. Specifically, the differences between the present and first embodiments are: the refractive power of the sixth lens elements 860 is positive, the object-side surface 821 of the second lens element 820 comprises a convex portion 8211 in a vicinity of the optical axis and a concave portion 8212 in a vicinity of a periphery of the second lens element 820, the object-side surface 861 of the sixth lens element 860 comprises a convex portion 8611 in a vicinity of the optical axis and a convex portion 8612 in a vicinity of a periphery of the sixth lens element 860, the image-side surface 862 of the sixth lens element 860 is a concave surface comprising a concave portion 8621 in a vicinity of the optical axis and a concave portion 8622 in a vicinity of a periphery of the sixth lens element 860. Please refer to FIG. 36 for the optical characteristics and their air gaps of each lens elements in the optical imaging lens 8 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 8 which shows that the distance from the object-side surface 811 of the first lens element 810 to the image plane 880 along the optical axis is 4.637 mm and the length of the optical imaging lens 8 is shortened, compared with that of the conventional optical imaging lens and even with that of the optical imaging lens 1 of the first embodiment.

As shown in FIG. 35(a), the longitudinal spherical aberration curves of different wavelengths are all controlled within ±0.035 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 35(b), it shows the astigmatism aberration in the sagittal direction (b) and the focus variation with respect to the three wavelengths in the whole field falls within ±0.08 mm. Please refer to FIG. 35(c), it shows astigmatism aberration in the tangential direction (c) and the focus variation with respect to the three wavelengths in the whole field falls within ±0.12 mm. Additionally, the closed curves represents dispersion is improved.

Please refer to FIG. 35(d), distortion aberration, which showing the distortion aberration of the optical imaging lens 1 is within ±1.6%.

Therefore, from FIGS. 35(a)~35(d), the optical imaging lens 8 of the present embodiment shows great characteristics in the longitudinal spherical aberration, astigmatism in the sagittal direction, astigmatism in the tangential direction, and distortion aberration. According to above illustration, the optical imaging lens 8 of the example embodiment indeed achieves great optical performance and the length of the optical imaging lens 8 is effectively shortened.

Figure 38:
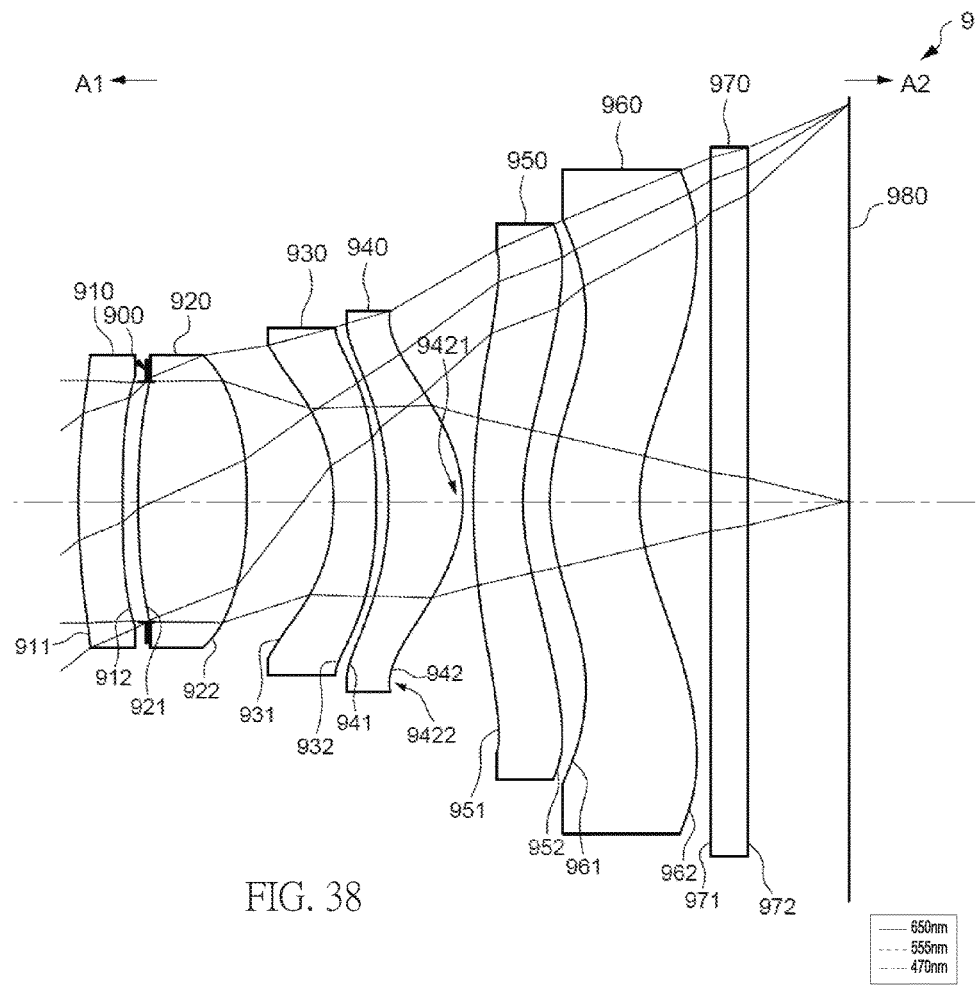
FIG. 38 is a cross-sectional view of an ninth embodiment of an optical imaging lens having six lens elements according to the present disclosure.
Figure 39:
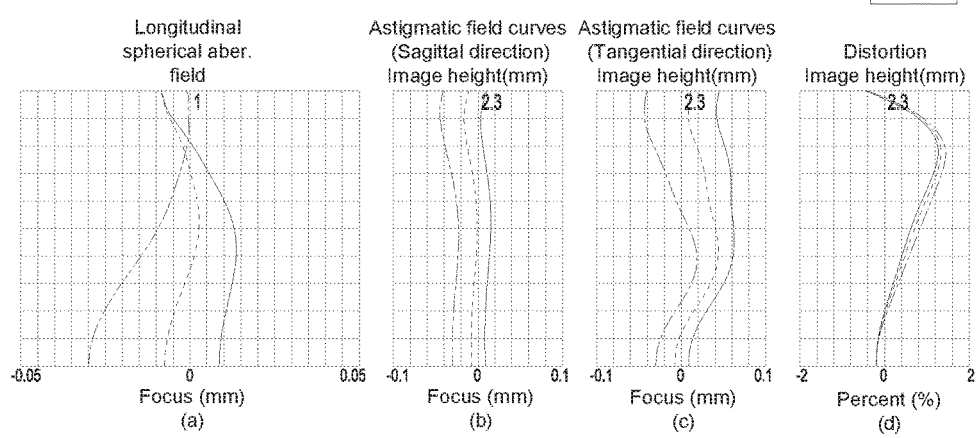
FIG. 39 is a chart of longitudinal spherical aberration and other kinds of optical aberrations of an ninth embodiment of the optical imaging lens according the present disclosure.

Reference is now made to FIGS. 38-41. FIG. 38 illustrates an example cross-sectional view of an optical imaging lens 9 having six lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, comprises a first lens element 910, an aperture stop 900, a second lens element 920, a third lens element 930, a fourth lens element 940, a fifth lens element 950 and a sixth lens element 960.

The differences between the ninth embodiment and the first embodiment are the radius of curvature and thickness of each lens element, the distance of each air gap, back focal length, configuration of the concave/convex shape of the image-side surfaces 942 and the refractive power of the sixth lens elements 960, but the configuration of the positive/negative refractive power of the first, second, third, fourth and fifth lens elements 910, 920, 930, 940, 950 and configuration of the concave/convex shape of surfaces, comprising the object-side surfaces 911, 921, 931, 941, 951, 961 facing to the object side A1 and the image-side surfaces 912, 922, 932, 952, 962 facing to the image side A2, are similar to those in the first embodiment. Here, for clearly showing the drawings of the present embodiment, only the surface shapes which are different from that in the first embodiment are labeled. Specifically, the differences between the present and first embodiments are: the refractive power of the sixth lens elements 960 is positive, t the image-side surface 942 of the fourth lens element 940 comprises a convex portion 9421 in a vicinity of the optical axis and a concave portion 9422 in a vicinity of a periphery of the fourth lens element

940 Please refer to FIG. 40 for the optical characteristics and their air gaps of each lens elements in the optical imaging lens 9 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 9 which shows that the distance from the object-side surface 911 of the first lens element 910 to the image plane 980 along the optical axis is 4.348 mm and the length of the optical imaging lens 9 is shortened, compared with that of the conventional optical imaging lens.

As shown in FIG. 39(*a*), the longitudinal spherical aberration curves of different wavelengths are all controlled within ±0.03 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 39(*b*), it shows the astigmatism aberration in the sagittal direction (b) and the focus variation with respect to the three wavelengths in the whole field falls within ±0.06 mm. Please refer to FIG. 39(*c*), it shows astigmatism aberration in the tangential direction (c) and the focus variation with respect to the three wavelengths in the whole field falls within ±0.08 mm. Additionally, the closed curves represents dispersion is improved.

Please refer to FIG. 39(*d*), distortion aberration, which showing the distortion aberration of the optical imaging lens 1 is within ±1.6%.

Therefore, from FIGS. 39(*a*)~39(*d*), the optical imaging lens 9 of the present embodiment shows great characteristics in the longitudinal spherical aberration, astigmatism in the sagittal direction, astigmatism in the tangential direction, and distortion aberration. According to above illustration, the optical imaging lens 9 of the example embodiment indeed achieves great optical performance and the length of the optical imaging lens 9 is effectively shortened.

Figure 42:
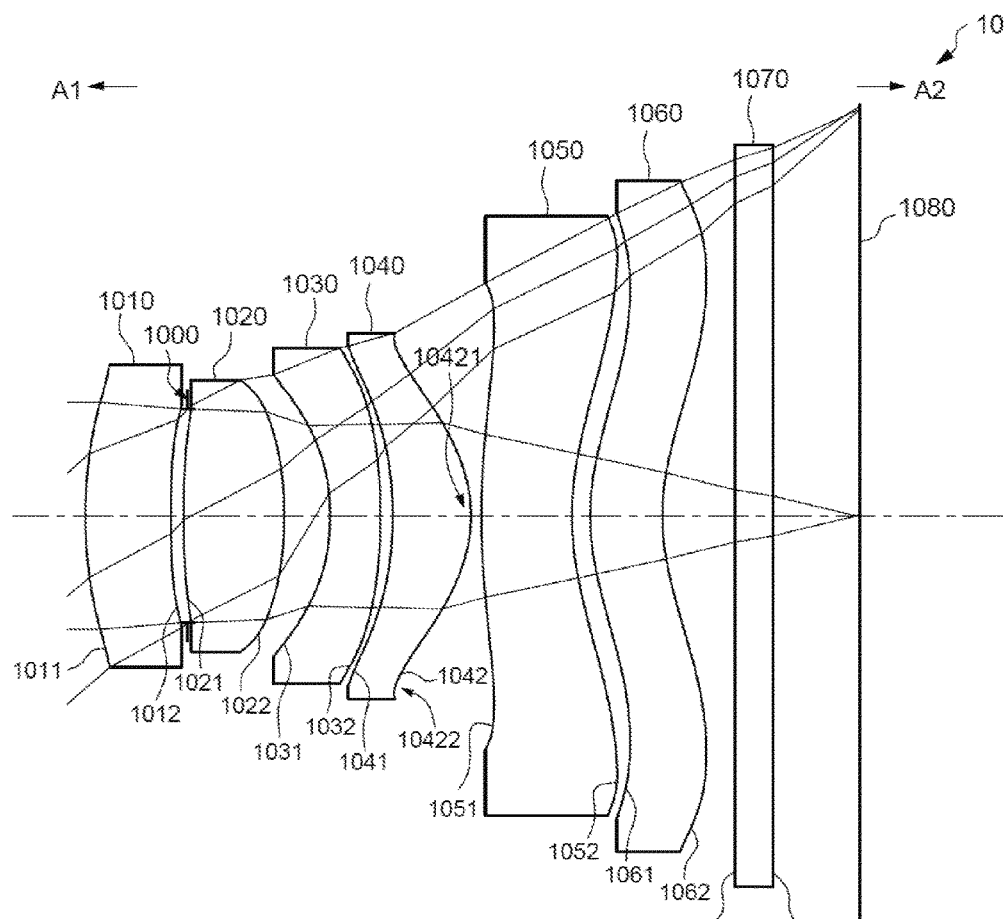
FIG. 42 is a cross-sectional view of a tenth embodiment of an optical imaging lens having six lens elements according to the present disclosure.
Figure 43:
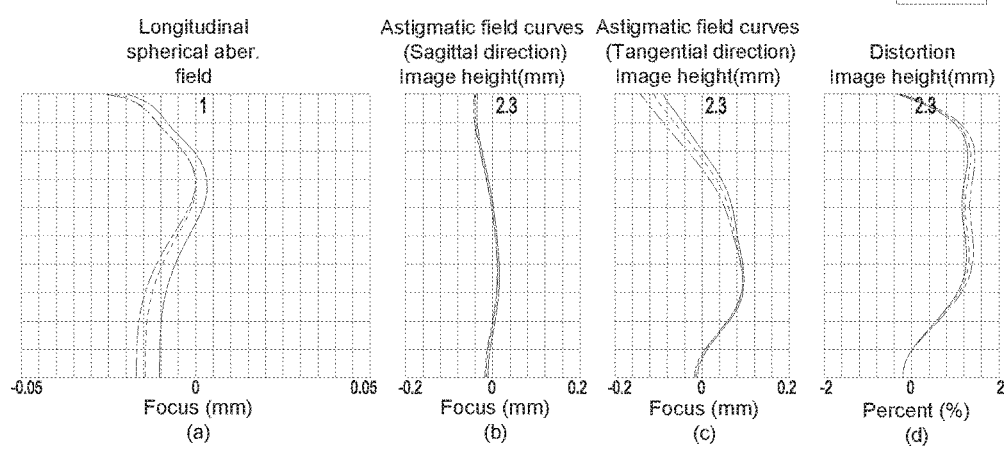
FIG. 43 is a chart of longitudinal spherical aberration and other kinds of optical aberrations of a tenth embodiment of the optical imaging lens according the present disclosure.

Reference is now made to FIGS. 42-45. FIG. 42 illustrates an example cross-sectional view of an optical imaging lens 10 having six lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, comprises a first lens element 1010, an aperture stop 1000, a second lens element 1020, a third lens element 1030, a fourth lens element 1040, a fifth lens element 1050 and a sixth lens element 1060.

The differences between the tenth embodiment and the first embodiment are the radius of curvature and thickness of each lens element, the distance of each air gap, back focal length, configuration of the concave/convex shape of the image-side surfaces 1042, and the refractive power of the sixth lens elements 1060, but the configuration of the positive/negative refractive power of the first, second, third, fourth, and fifth lens elements 1010, 1020, 1030, 1040, 1050, and configuration of the concave/convex shape of surfaces, comprising the object-side surfaces 1011, 1021, 1031, 1041, 1051, 1061 facing to the object side A1 and the image-side surfaces 1012, 1022, 1032, 1052, 1062 facing to the image side A2, are similar to those in the first embodiment. Here, for clearly showing the drawings of the present embodiment, only the surface shapes which are different from that in the first embodiment are labeled. Specifically, the differences between the present and first embodiments are: the refractive power of the sixth lens elements 1060 is positive, the image-side surface 1042 of the fourth lens element 1040 comprises a convex portion 10421 in a vicinity of the optical axis and a concave portion 10422 in a vicinity of a periphery of the fourth lens element 1040. Please refer to FIG. 44 for the optical characteristics and their air gaps of each lens elements in the optical imaging lens 10 the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The optical imaging lens 10 which shows that the distance from the object-side surface 1011 of the first lens element 1010 to the image plane 1080 along the optical axis is 4.280 mm and the length of the optical imaging lens 10 is shortened, compared with that of the conventional optical imaging lens.

As shown in FIG. 43(*a*), the longitudinal spherical aberration curves of different wavelengths are all controlled within ±0.03 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 43(*b*), it shows the astigmatism aberration in the sagittal direction (b) and the focus variation with respect to the three wavelengths in the whole field falls within ±0.08 mm. Please refer to FIG. 43(*c*), it shows astigmatism aberration in the tangential direction (c) and the focus variation with respect to the three wavelengths in the whole field falls within ±0.16 mm. Additionally, the closed curves represents dispersion is improved.

Please refer to FIG. 43(*d*), distortion aberration, which showing the distortion aberration of the optical imaging lens 1 is within ±1.6%.

Therefore, from FIGS. 43(*a*)~43(*d*), the optical imaging lens 10 of the present embodiment shows great characteristics in the longitudinal spherical aberration, astigmatism in the sagittal direction, astigmatism in the tangential direction, and distortion aberration. According to above illustration, the optical imaging lens 10 of the example embodiment indeed achieves great optical performance and the length of the optical imaging lens 10 is effectively shortened.

Figure 46:
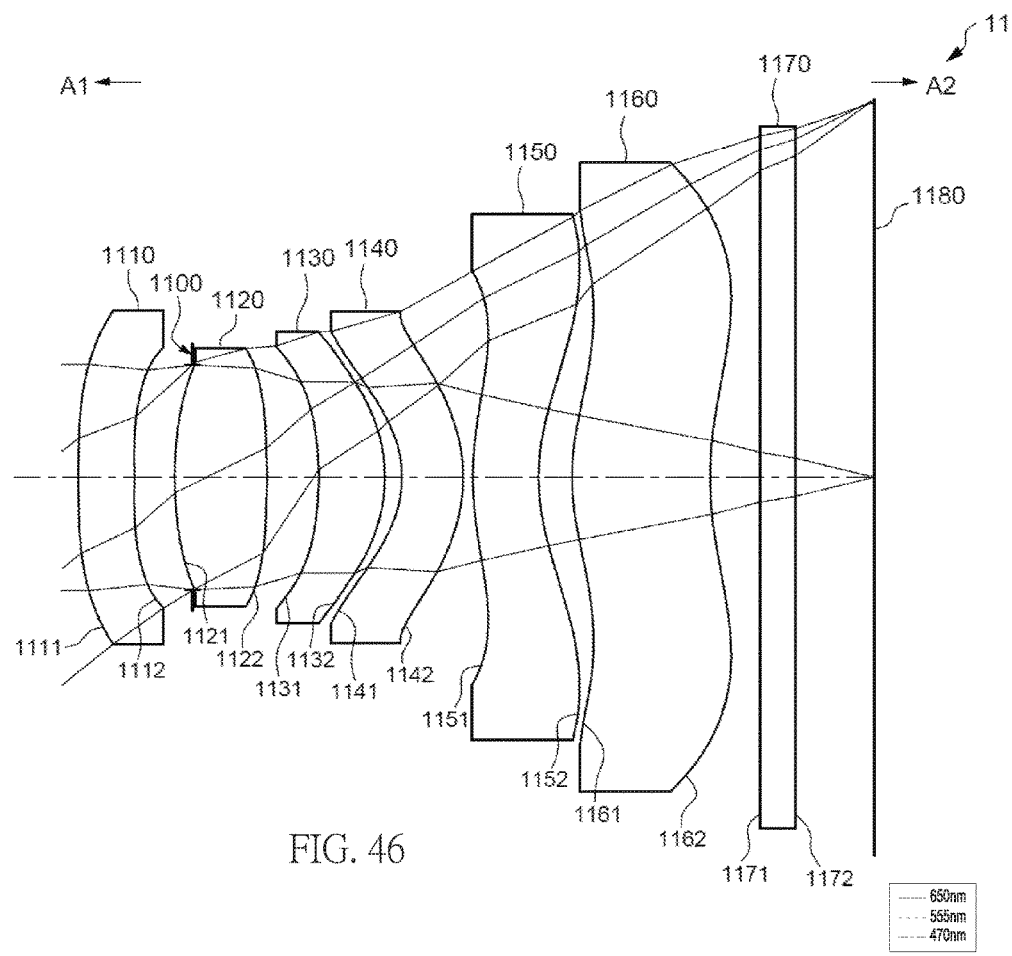
FIG. 46 is a cross-sectional view of a eleventh embodiment of an optical imaging lens having six lens elements according to the present disclosure.
Figure 47:
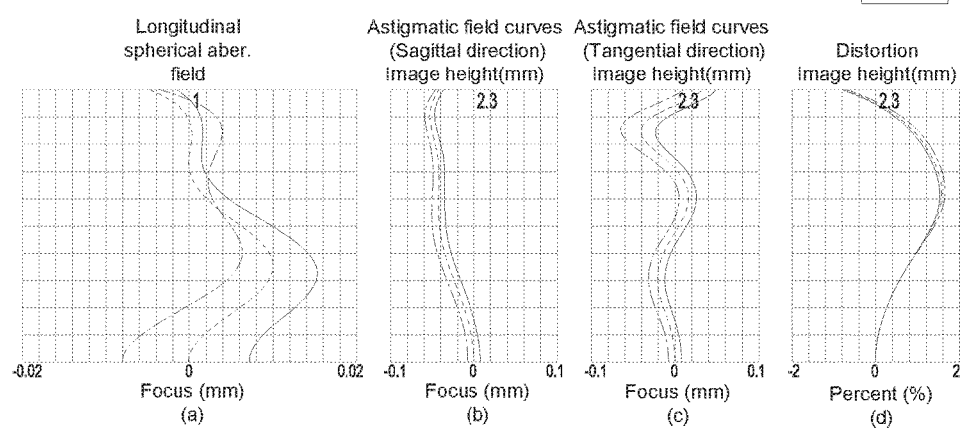
FIG. 47 is a chart of longitudinal spherical aberration and other kinds of optical aberrations of a eleventh embodiment of the optical imaging lens according the present disclosure.

Reference is now made to FIGS. 46-49. FIG. 46 illustrates an example cross-sectional view of an optical imaging lens 11 having six lens elements of the optical imaging lens according to a eleventh example embodiment. FIG. 47 shows example charts of longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment, in an order from an object side A1 to an image side A2 along an optical axis, comprises a first lens element 1110, an aperture stop 1100, a second lens element 1120, a third lens element 1130, a fourth lens element 1140, a fifth lens element 1150 and a sixth lens element 1160.

The differences between the eleventh embodiment and the first embodiment are the radius of curvature and thickness of each lens element, the distance of each air gap, back focal length, the refractive powers of the third, fourth, and sixth lens elements 1130, 1140, and 1160, but the configuration of the positive/negative refractive power of the first, second, and fifth lens elements 1110, 1120, 1150 and configuration of the concave/convex shape of surfaces, comprising the object-side surfaces 1111, 1121, 1131, 1141, 1151, 1161, facing to the object side A1 and the image-side surfaces 1112, 1122, 1132, 1142, 1152, 1162 facing to the image side A2, are similar to those in the first embodiment. Here, for clearly showing the drawings of the present embodiment, only the surface shapes which are different from that in the first embodiment are labeled. Specifically, the refractive power of the third lens element 1130 is positive, the fourth lens element 1140 has a negative refractive power, and the sixth lens element 1160 has a positive refractive power. Please refer to FIG. 48 for the optical characteristics of each lens elements in the optical imaging lens 11 of the present embodiment, and please refer to FIG. 50 for the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56) of the present embodiment.

The distance from the object-side surface 1111 of the first lens element 1110 to the image plane 1180 along the optical axis is 4.749 mm and the length of the optical imaging lens 11 is shortened compared with conventional optical imaging lenses. Thus, the optical imaging lens 11 is capable to provide excellent imaging quality for smaller sized mobile devices.

As shown in FIG. 47(a), the longitudinal spherical aberration curves of different wavelengths are all controlled within ±0.016 mm. This represents off-axis light with respect to these wavelengths is focused around an image point. Therefore, the present embodiment improves the longitudinal spherical aberration with respect to different wavelengths. Furthermore, the longitudinal spherical aberrations for those three representative wavelengths are all very close, that means the longitudinal spherical aberration indeed improved.

Please refer to FIG. 47(b), it shows the astigmatism aberration in the sagittal direction (b) and the focus variation with respect to the three wavelengths in the whole field falls within ±0.06 mm. Please refer to FIG. 47(c), it shows astigmatism aberration in the tangential direction (c) and the focus variation with respect to the three wavelengths in the whole field falls within ±0.08 mm. Additionally, the closed curves represents dispersion is improved.

Please refer to FIG. 47(d), distortion aberration, which showing the distortion aberration of the optical imaging lens 1 is within ±2.0%.

Therefore, from FIGS. 47(a)~47(d), the optical imaging lens 11 of the present embodiment shows great characteristics in the longitudinal spherical aberration, astigmatism in the sagittal direction, astigmatism in the tangential direction, and distortion aberration. According to above illustration, the optical imaging lens 11 of the example embodiment indeed achieves great optical performance and the length of the optical imaging lens 11 is effectively shortened.

Please refer to FIG. 50, which shows the values of T1, G12, T2, G23, T3, G34, T4, G45, T5, G56, T6, G6F, TF, GFP, ALT, AAG, BFL, TTL, EFL, v1, v5, EFL/G12, ALT/T1, EFL/T4, T1/G12, T3/G12, T2/T1, EFL/T1, T5/G12, T2/G12, v1-v5, BFL/T1, EFL/T2, T4/G12, AAG/T1, ALT/G12, T1/T5, T6/T4, BFL/(G23+G34+G45+G56), of all eleven embodiments, and it is clear that the optical imaging lens of the present invention satisfy the Equations (1)~(18).

Figure 51:
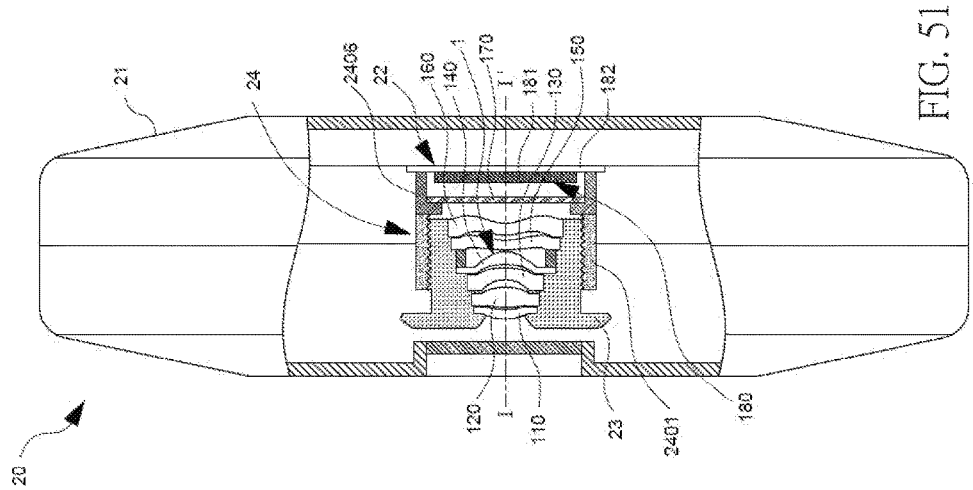
FIG. 51 is a structure of an example embodiment of a mobile device.

Reference is now made to FIG. 51, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, mobile phones, tablet computers, personal digital assistants (PDA), gaming machines, such as video game consoles, handhold game console, etc., environmental monitors, event data recorders, reversing camera systems mounted on motor vehicles, wide-angle camera, etc.

As shown in FIG. 51, the photography module 22 may comprise an aforesaid optical imaging lens with six lens elements, which is a prime lens and for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

An air gap is formed between any two adjacent lens elements of the six lens elements 110, 120, 130, 140, 150, 160, positioned in the lens barrel 23.

The module housing unit 24 comprises a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is positioned at the inside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 4.761 mm, the size of the mobile device 20 may be quite small. Therefore, the embodiments described herein can save the production cost of the housing and meets the market demand for smaller sized product designs.

Figure 52:
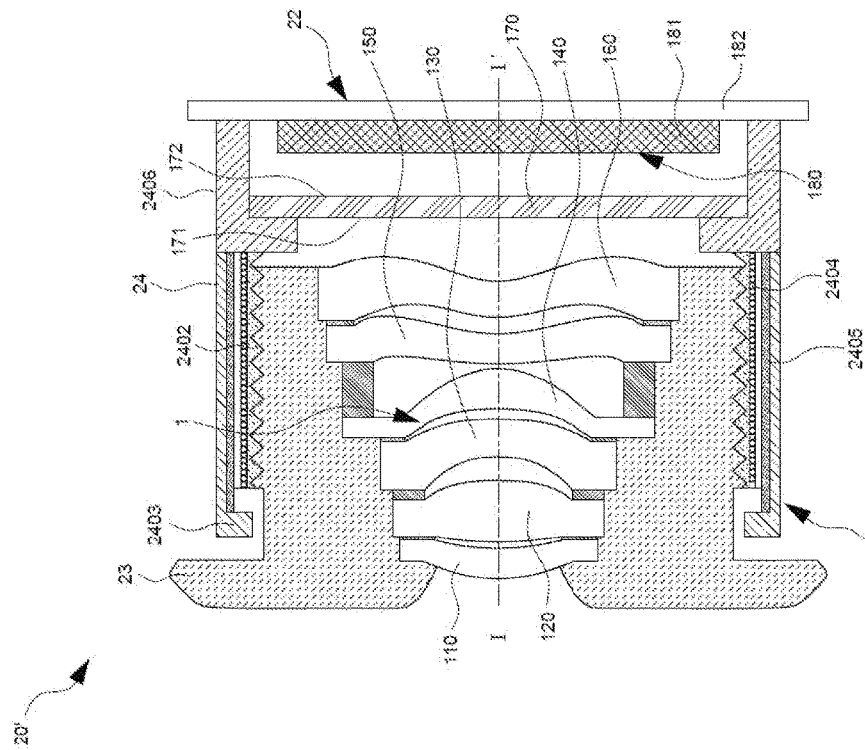
FIG. 52 is a partially enlarged view of the structure of another example embodiment of a mobile device.

Reference is now made to FIG. 52, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the outside of the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.761 mm, is shortened, the mobile device 20' may be designed with a smaller size and meanwhile good optical performance is still provided. Therefore, the present embodiment can save the production cost of the housing and meets the demand of small sized product design and the request of the market.

According to above illustration, it is clear that the camera device and the optical imaging lens thereof in example embodiments, through controlling the detail structure of the six lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, an aperture stop, a second lens element, a third lens element, a fourth lens element, a fifth lens element and a sixth lens element, each of said first, second, third, fourth, fifth and sixth lens elements having refractive power, an object-side surface facing toward the object side and an image-side surface facing toward the image side axis, wherein:

said image-side surface of said first lens element comprises a concave portion in a vicinity of the optical axis;

said image-side surface of said second lens element comprises a convex portion in a vicinity of the optical axis;

said object-side surface of said third lens element comprises a concave portion in a vicinity of the optical axis;

said object-side surface of said third lens element comprises a concave portion in a vicinity of a periphery of the third lens element;

said object-side surface of said fourth lens element comprises a concave portion in a vicinity of the optical axis;

said fifth lens element has negative refractive power, and said image-side surface of said fifth lens element comprises a concave portion in a vicinity of the optical axis; and said image-side surface of said sixth lens element comprises a concave portion in a vicinity of the optical axis and made of plastic; and wherein said optical imaging lens comprises no other lenses having refractive power beyond the six lens elements, and wherein a central thickness of the first lens element along the optical axis is T1, an effective focal length of the optical imaging lens, is EFL, and wherein EFL and T1 satisfy the equation:

$$EFL/T1 \leq 13.$$

2. The optical imaging lens according to claim 1, wherein an air gap between the first lens element and the second lens element along the optical axis is G12, and EFL, and G12 satisfy the equation:

$$EFL/G12 \leq 86.$$

3. The optical imaging lens according to claim 2, wherein a sum of the thickness of all six lens elements along the optical axis is ALT, and ALT and T1 satisfy the equation:

$$ALT/T1 \leq 9.3.$$

4. The optical imaging lens according to claim 1, wherein a central thickness of the fourth lens element along the optical axis is T4, and EFL, and T4 satisfy the equation:

$$EFL/T4 \leq 11.7.$$

5. The optical imaging lens according to claim 4, wherein an air gap between the first lens element and the second lens element along the optical axis is G12, and G12 and T1 satisfy the equation:

$T1/G12 \leq 7.$

6. The optical imaging lens according to claim 1, wherein a central thickness of the third lens element along the optical axis is T3, an air gap between the first lens element and the second lens element along the optical axis is G12, and T3, and G12 satisfy the equation:

$T3/G12 \leq 7.$

7. The optical imaging lens according to claim 6, wherein a central thickness of the second lens element along the optical axis is T2, and T1 and T2 satisfy the equation:

$T1/T2 \leq 1.66.$

8. The optical imaging lens according to claim 1, wherein a central thickness of the fifth lens element along the optical axis is T5, an air gap between the first lens element and the second lens element along the optical axis is G12, and T5 and G12 satisfy the equation:

$T5/G12 \leq 7.4.$

9. The optical imaging lens according to claim 1, wherein a central thickness of the second lens element along the optical axis is T2, an air gap between the first lens element and the second lens element along the optical axis is G12, and T2 and G12 satisfy the equation:

$T2/G12 \leq 7.7.$

10. The optical imaging lens according to claim 9, wherein an abbe number of the first lens element is v1, an abbe number of the fifth lens element is v5, and v1 and v5 satisfy the equation:

$|v1-v5| \leq 10.$

11. The optical imaging lens according to claim 1, wherein a back focal length of the optical imaging lens, which is defined as a distance from the image-side surface of the sixth lens element to an image plane along the optical axis is BFL, and T1 and BFL satisfy the equation:

$BFL/T1 \leq 4.$

12. The optical imaging lens according to claim 11, wherein a central thickness of the second lens element along the optical axis is T2, and T2 and EFL satisfy the equation:

$EFL/T2 \leq 8.2.$

13. The optical imaging lens according to claim 1, wherein a central thickness of the fourth lens element along the optical axis is T4, an air gap between the first lens element and the second lens element along the optical axis is G12, and T4 and G12:

$T4/G12 \leq 6.5.$

14. The optical imaging lens according to claim 13, wherein a sum of all five air gaps from the first lens element to the sixth lens element along the optical axis is AAG, and T1 and AAG satisfy the equation:

$AAG/T1 \leq 3.$

15. The optical imaging lens according to claim 1, wherein a sum of the thickness of all six lens elements along the optical axis is ALT, an air gap between the first lens element and the second lens element along the optical axis is G12, and ALT and G12 satisfy the equation:

$ALT/G12 \leq 60.$

16. The optical imaging lens according to claim 15, wherein a central thickness of the fifth lens element along the optical axis is T5, and T1 and T5:

$0.85 \leq T1/T5 \leq 1.5.$

17. The optical imaging lens according to claim 1, wherein a central thickness of the fourth lens element along the optical axis is T4, a central thickness of the sixth lens element along the optical axis is T6, and T4 and T6 satisfy the equation:

$T6/T4 \leq 2.6.$

18. The optical imaging lens according to claim 1, wherein a back focal length of the optical imaging lens, which is defined as a distance from the image-side surface of the sixth lens element to an image plane along the optical axis is BFL, an air gap between the second lens element and the third lens element along the optical axis is G23, an air gap between the third lens element and the fourth lens element along the optical axis is G34, an air gap between the fourth lens element and the fifth lens element along the optical axis is G45, an air gap between the fifth lens element and the sixth lens element along the optical axis is G56, and BFL, G23, G34, G45 and G56 satisfy the equation:

$1.65 \leq BFL/(G23+G34+G45+G56) \leq 4.5.$

19. A mobile device, comprising:
a housing; and
a photography module positioned in the housing and comprising:
an optical imaging lens, sequentially from an object side to an image side along an optical axis, comprising a first lens element, an aperture stop, a second lens element, a third lens element, a fourth lens element, a fifth lens element and a sixth lens element, each of said first, second, third, fourth, fifth and sixth lens elements having refractive power, an object-side surface facing toward the object side and an image-side surface facing toward the image side axis, wherein:
said image-side surface of said first lens element comprises a concave portion in a vicinity of the optical axis;
said image-side surface of said second lens element comprises a convex portion in a vicinity of the optical axis;
said object-side surface of said third lens element comprises a concave portion in a vicinity of the optical axis;
said object-side surface of said third lens element comprises a concave portion in a vicinity of a periphery of the third lens element;
said object-side surface of said fourth lens element comprises a concave portion in a vicinity of the optical axis;
said fifth lens element has negative refractive power, and said image-side surface of said fifth lens element comprises a concave portion in a vicinity of the optical axis; and
said image-side surface of said sixth lens element comprises a concave portion in a vicinity of the optical axis and made of plastic; and
wherein a central thickness of the first lens element along the optical axis is T1, an effective focal length of the optical imaging lens, is EFL, and
wherein EFL and T1 satisfy the equation:

$EFL/T1 \leq 13;$ and wherein said optical imaging lens comprises no other lenses having refractive power beyond the six lens elements; and a lens barrel for positioning the optical imaging lens;

a module housing unit for positioning the lens barrel; and an image sensor positioned at the image side of the optical imaging lens.

* * * * *

UNITED STATES PATENT AND TRADEMARK OFFICE
CERTIFICATE OF CORRECTION

PATENT NO.         : 9,851,532 B2
APPLICATION NO.    : 14/605648
DATED              : December 26, 2017
INVENTOR(S)        : Shih-Han Chen, Yan Bin Chen and Baina Chen It is certified that error appears in the above-identified patent and that said Letters Patent is hereby corrected as shown below:

In the Claims

Claim 16, Column 32, Line 4, the formula should read: "$0.85 \leq T1/T5 \leq 4.5$."

Signed and Sealed this
Fifth Day of June, 2018

Andrei Iancu
*Director of the United States Patent and Trademark Office*